US012795224B1

(12) United States Patent
Bhattarai et al.

(10) Patent No.: US 12,795,224 B1
(45) Date of Patent: Nov. 10, 2026

(54) CAMERA DEVICE WITH TAPERED LIGHT PIPE

(71) Applicant: Amazon Technologies, Inc., Seattle, WA (US)

(72) Inventors: Matrika Bhattarai, Milpitas, CA (US); Sifang Cui, Sunnyvale, CA (US); Michael James O'Connor, Charlestown, MA (US); Thomas Burns, Patchogue, NY (US); Emmanuel Laffon de Mazieres, Danville, CA (US)

(73) Assignee: Amazon Technologies, Inc., Seattle, WA (US)

( * ) Notice: Subject to any disclaimer, the term of this patent is extended or adjusted under 35 U.S.C. 154(b) by 618 days.

(21) Appl. No.: 18/076,975

(22) Filed: Dec. 7, 2022

(51) Int. Cl.
*H04N 23/56* (2023.01)
*F21K 9/61* (2016.01)
*F21V 8/00* (2006.01)
*F21V 23/00* (2015.01)
*H04N 5/33* (2023.01)

(52) U.S. Cl.
CPC ............... *H04N 23/56* (2023.01); *F21K 9/61* (2016.08); *F21V 23/005* (2013.01); *G02B 6/0096* (2013.01); *F21V 2200/40* (2015.01); *H04N 5/33* (2013.01)

(58) Field of Classification Search
CPC .. H04N 23/56; H04N 5/33; F21K 9/61; F21V 23/005; F21V 2200/40; G02B 6/0096
See application file for complete search history.

(56) References Cited

U.S. PATENT DOCUMENTS

| | | | | | |
|---|---|---|---|---|---|
| 4,180,847 | A * | 12/1979 | Cresko | G08B 5/36 | 362/559 |
| 5,785,404 | A * | 7/1998 | Wiese | F21V 5/02 | 362/555 |
| 7,978,259 | B2 * | 7/2011 | Matsuo | G06V 10/143 | 348/370 |
| 11,614,579 | B2 * | 3/2023 | Wright | G02B 6/0043 | 362/606 |
| 2007/0281322 | A1 * | 12/2007 | Jaffe | G01J 3/10 | 435/7.1 |
| 2013/0215638 | A1 * | 8/2013 | Dabov | G02B 6/0086 | 156/247 |
| 2014/0043845 | A1 * | 2/2014 | Chen | F21K 9/61 | 362/555 |
| 2020/0274995 | A1 * | 8/2020 | Coleman | H04N 23/54 | |
| 2023/0030276 | A1 * | 2/2023 | Fernandez-Dorado | G06K 7/10742 | |

FOREIGN PATENT DOCUMENTS

| | | | | |
|---|---|---|---|---|
| CN | 107284353 B * | 7/2019 | | H04N 7/181 |

* cited by examiner

*Primary Examiner* — Abdulmajeed Aziz
*Assistant Examiner* — Jessica M Apenteng
(74) *Attorney, Agent, or Firm* — Eversheds Sutherland (US) LLP

(57) ABSTRACT

An electronic device includes a printed circuit board (PCB), a lighting element disposed the PCB, and a light pipe configured to receive light from the lighting element. The light pipe has a first end, a second end opposite the first end, a central longitudinal axis that extends between the first end and the second end, a taper formed on at least a portion of the light pipe, between the first end and the second end in a direction along the central longitudinal axis, and one or more dimples formed on the second end.

24 Claims, 25 Drawing Sheets

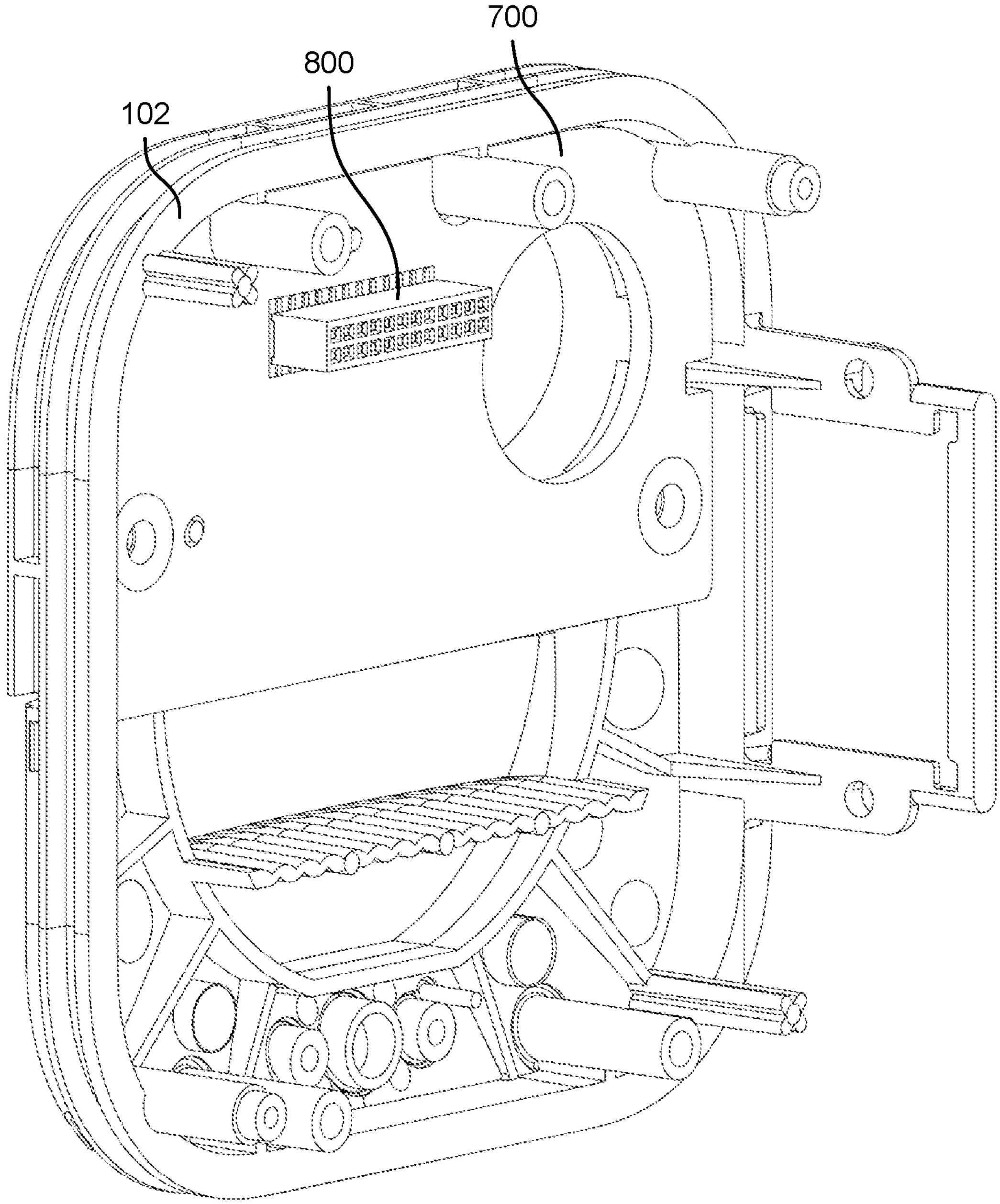
FIG. 8B
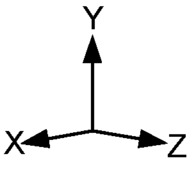

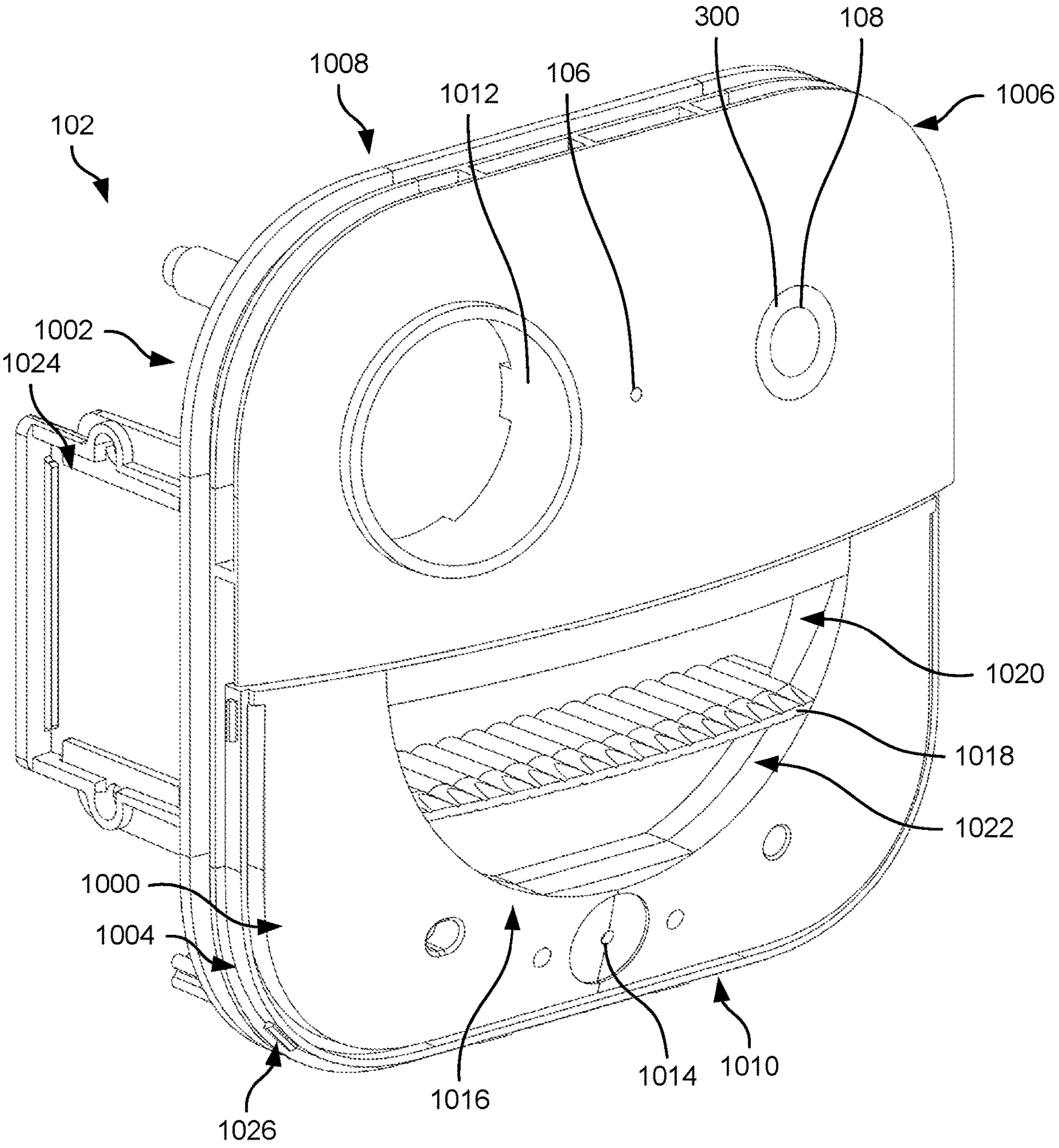
FIG. 10A
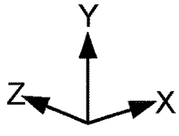

CAMERA DEVICE WITH TAPERED LIGHT PIPE

BACKGROUND

Security is a concern for many homeowners, businesses, and the like. In some examples, those seeking to protect or monitor their homes or place of business may wish to have video and/or audio communications. Devices, for example, may be placed adjacent to an external door or entryway. However, conventional devices may be unaesthetically appealing, have large form factors, and/or have suboptimal audio and/or video characteristics.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The devices and systems depicted in the accompanying figures are not to scale and components within the figures may be depicted not to scale with each other.

FIG. 8B illustrates a second partial view of the device of FIG. 1, showing the PCB of FIG. 7 coupled to the cover of FIG. 7, according to examples of the present disclosure.

FIGS. 10A-10D illustrate various views of the cover of FIG. 7, according to examples of the present disclosure.

DETAILED DESCRIPTION

Figure 1:
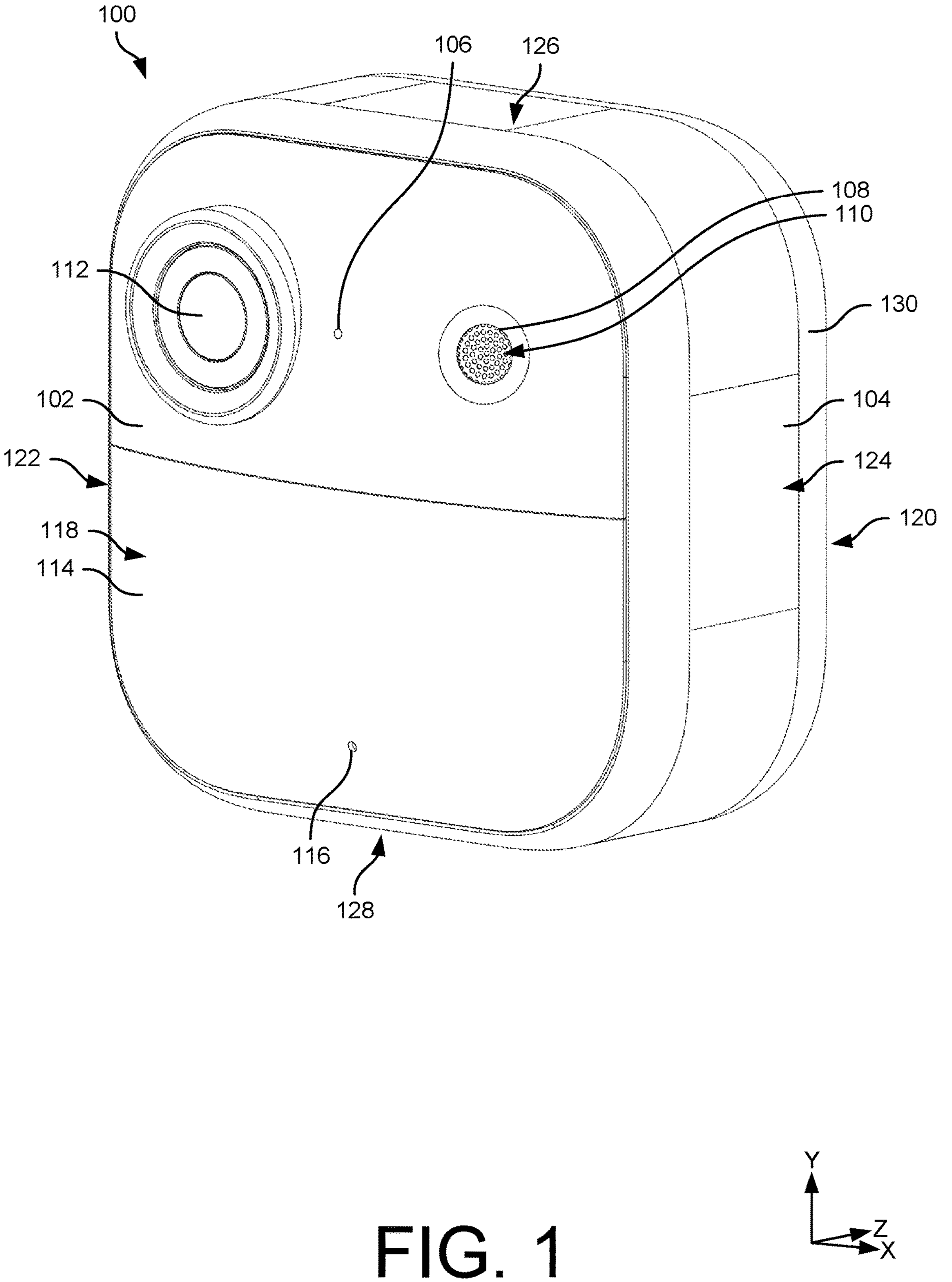
FIG. 1 illustrates a front perspective view of an example device, according to examples of the present disclosure.

This application is directed, at least in part, to a device having improved motion sensing capabilities. In some instances, the device includes a housing, a front cover coupled to the housing, and a rear cover coupled to the housing, opposite the front housing. A camera may be oriented to capture images and/or video within an environment of the device, such as in front of the device. An infrared (IR) light emitting diode (LED) may be arranged to output IR light in order to detect motion in front of the device. The front cover may define a channel through which the IR LED emits IR light into the environment. The device may also include a light pipe at least partially disposed within the channel. In some instances, the IR light pipe includes dimples formed on an exterior-facing surface and/or different surface finishes (e.g., high-gloss, textured, etc.). The configuration of the light pipe may uniformly distribute the IR light into the environment to enable the device to more accurately sense motion.

In some instances, the front cover defines a plurality of channels through which sensors or components of the device are disposed and/or oriented. For example, the front cover may include a first channel for outputting light (e.g., visible light) from a lighting element (e.g., LED) disposed beneath the front cover. The lighting element may output light (e.g., color, frequency, etc.) indicative of an operational state of the device (e.g., recording audio, sensed motion, recording video, etc.). The front cover may also include a second channel through which the IR LED is configured to emit IR light. A third channel of the front cover may receive a camera lens of the camera, and the camera is arranged to image the environment via the third channel. Additionally, in some instances, a fourth channel of the front cover may direct sound to a microphone located within the device. In some instances, the first channel, the second channel, and the third channel are horizontally aligned with one another. Additionally, or alternatively, the first channel may be vertically aligned with the fourth channel.

Introduced above, the second channel is configured to at least partially receive the light pipe. In some instances, the light pipe may be substantially cylindrical in shape. In some instances, the light pipe includes a first portion and a second portion. The second portion may include a taper relative to the first portion. For example, the light pipe may include a central axis. The first portion may extend substantially parallel to the central axis, and the second portion may extend traverse to the central axis. For example, the second portion may taper inwards towards the central axis. In some instances, the first portion includes a first cross-sectional dimension (e.g., diameter), and the second portion includes a second cross-sectional dimension (e.g., diameter) that is less than the first portion. In some instances, the taper may have a ratio of 0.9. For example, the ratio of the second cross-sectional dimension to the first cross-sectional dimension may be 0.9.

In some instances, the light pipe includes the taper in order to accommodate, match, or be complimentary to an exterior surface of the front cover. For example, the front cover may include a curved profile, and the tapered shape of the second portion of the light pipe may compliment the exterior surface of the front cover. The tapered shape may also increasing a viewing angle of the IR light emitted from the IR LED. For example, the taper of the light pipe may assist in distributing the IR light into the environment to allow IR receiver(s) (or sensors) to detect motion.

In some instances, the light pipe includes ribs (or other features) that engage with an interior of the second channel. The ribs may increase a friction between the light pipe and the second channel, and/or form a compression fit between the light pipe and the second channel. The light pipe may include any number of ribs, and in some instances, the ribs are annularly disposed about the exterior surface of the light pipe. In some instances, the ribs may be disposed on the first portion and/or the second portion of the light pipe.

The light pipe may further include a first end and a second end opposite the first end. In some instances, the first end and the second end are circular shaped. The first end may be disposed on/at the first portion and may be oriented towards the IR LED. The second end may be disposed on at/the second portion and may be oriented towards the environment. The first end may correspond to an input facet of the light pipe, while the second end may correspond to an output facet of the light pipe. The first end may include a surface that is concaved shape and may at least partially receive the IR LED. For example, with the concaved-nature of the first end of the light pipe, the IR LED may reside within a cavity formed at the first end. The second end may additionally or alternatively include a surface that is concaved shaped to compliment the exterior surface of the front cover. In some instances, the concaved shaped of the first end and the second end may diverge IR light rays emitted via the IR LED to create a larger field of view.

In some instances, the surface at the second end may also include depressions, cavities, or other dimples. The dimples formed within the surface may assist in uniformly distributing the IR light into the environment and/or reducing hot spots within the light pipe. By reducing or eliminating the hot spots, the light pipe may spread or disperse the IR light into the environment to sense motion. In some instances, the dimples may be spherically-shaped, cylindrically shaped, hexagonally shaped, and so forth. In some instances, the dimples include a radius of one-hundred microns.

In some instances, given the taper of the light pipe, the second channel may include a shape or profile that is complimentary to receive the light pipe (or a portion thereof). For example, in some instances, the second portion of the light pipe may be disposed at least partially within a tapered portion of the second channel. The taper of the second portion of the light pipe and the tapered portion of the channel may complement one another such that the light pipe may be secured within the second channel. In some instances, the second channel includes an additional portion that receives at least part of the first portion of the light pipe. Additionally, to prevent or reduce light-bleeding from the IR LED, a gasket may be disposed at least partially around the light pipe and/or the IR LED. The gasket assist in directing IR light out the second channel.

In some instances, the light pipe includes different surface finishes. For example, the surface at the first end may include a first surface finish, while the surface at the second end (with the dimples) may have a second surface finish. In some instances, an exterior surface of the light pipe, between the first end and the second end, may include the first surface finish. For example, in some instances, the light pipe is formed from clear polycarbonate. The first end, the first portion, and/or the second portion, except the second end, may include a high-gloss/polished surface. The second end, meanwhile, may include a textured or roughened surface. In some instances, the second end includes a surface finish corresponding to a 21 on the Verein Deutscher Ingenieure (VDI) 3400 scale. In accordance with one or more preferred implementations, a surface finish is utilized that has a roughness average (RA-determined as an arithmetic average of the absolute values of the profile heights over the evaluation length) of around 1.12 micrometers (e.g., between 0.9 micrometers and 1.4 micrometers). In accordance with one or more preferred implementations, a surface finish is utilized that has a root mean square average of the profile height deviations from a mean line recorded within the evaluation length of around 54.60.

In some instances, the high-gloss surface finish may assist in refracting light through the light pipe, from the first end to the second end, while the VDI 21 surface finish may assist in light spreading and/or reducing hot spots.

In some instances, the lighting element and the IR LED are disposed on a printed circuit board (PCB) disposed beneath the front cover. The lighting element and the IR LED are oriented to emit light, respectively, through the first channel and the second channel of the front cover. In some instances, the gasket is disposed around the light pipe may be mounted to, or abut, the PCB. Additionally, in some instances, the IR light may be disposed within the gasket. A gasket may also be disposed around the lighting element and/or the lighting element may output light through an additional light pipe.

The device may also include an IR sensor that receives the IR light emitted via the IR LED. In some instances, the IR sensor is disposed beneath a sensor lens that couples to the front cover. The sensor lens may be transmissive to signals emitted from, and received by, the IR sensor. The device may also include a microphone disposed beneath the fourth channel, and/or a speaker is oriented to emit sound outward from the device. In some instances, the speaker is disposed within the housing and may be oriented to emit sound outward from a side of the device.

The rear cover may provide access to an interior of the device. For example, the rear cover may be decoupled from the housing via a fastening mechanism that secures the rear cover to the housing. Removing the rear cover may expose batteries of the device, which may be interchangeable and/or recharged. Additionally, the rear cover may include a pressure relief vent to vent air within the device (e.g., during a coupling of the rear cover to the housing) and/or while components of the device generate heat. The rear cover may also include a port that is capable of receiving a wire, cable, and the like (e.g., power cable, auxiliary, ethernet, etc.).

In addition to the PCB on which the IR LED and the lighting element are mounted, the device may include additional PCBs or printed circuit board assemblies (PCBAs) disposed within the housing. The camera, speaker, IR sensor, and/or PIR sensors may be mounted or otherwise coupled to the PCBs. Network interfaces (e.g., antenna(s)) wirelessly couple the device to one or more remote devices (e.g., mobile device, laptop, etc.) over one or more networks (e.g., Cellular, Wi-Fi, BLE, Bluetooth, etc.). The PCBs, as well as other computing components of the device, may be communicatively coupled to one another via one or more flex circuits, wires, connectors, and so forth.

The housing may include cutouts, apertures, recesses, and the like for accommodating or otherwise receiving the front cover and the rear cover. Additionally, the front cover may include cutouts, apertures, recesses, and the like for receiving the sensor lens. The housing may additionally or alternatively include various frames, mounts, and brackets for receiving components of the device, or to which components of the device couple. The housing, the front cover, the rear cover, and/or the sensor lens may also include various alignment mechanisms, such as tabs, pins, slits, and so forth for aligning components within the device. The front cover, the housing, and/or the rear cover may also couple to one another using various seals, gaskets, and so forth to environmentally seal the device.

In some instances, a mount may couple to the device to dispose the device on a vertical surface (e.g., wall) or a horizontal surface (e.g., shelf). In some instances, the mount may couple to the rear cover and may be removably coupled to the rear cover depending upon the configuration desired. For example, the device may rest (e.g., sit) on a horizontal surface without the mount. When the mount couples to the rear cover and the vertical surface, the device may hang.

The device may also include heat dissipating elements to disperse heat generated by components of the device. By way of example and not limitation, the camera(s), LEDs, power supply, network interfaces, and so forth generate heat during use. Without effectively dispersing or dissipating this heat, the internal components, such as the camera, may be adversely effected and become uncappable of performing its intended function. To efficiently dissipate heat generated by the components, heat dissipating elements may be included within the housing to transmit heat away from generating sources toward an exterior of the device. The pressure relief vent may also assist in dissipating heat accumulated with the device.

Additional details of the device are described in, for example, U.S. patent application Ser. No. 18/074,098, entitled “Audio/Visual (A/V) Device,” filed Dec. 2, 2022. This patent application, as well as any publications thereof or patents issuing therefrom, are herein incorporated by reference.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates a front perspective view of an example device 100, according to examples of the present disclosure. In some instances, the device 100 may represent an electronic device, audio/video (A/V) device, or other device configured to capture audio and/or video within an environment of the device 100. The device 100 is also capable of sensing motion within the environment.

In some instances, the device 100 includes a front cover 102 coupled to a housing 104. The front cover 102 may include a first channel 106 and a second channel 108. As will be discussed herein, a light emitting element, such as a light emitting diode (LED) of the device 100, for example, may be disposed beneath (e.g., Z-direction) the first channel 106 and may be configured to emit light out of the first channel 106. In some instances, the LED may output light via the first channel 106 according to an operational state of the device 100. Additionally, as will also be discussed herein, an infrared (IR) LED (or IR sensor), for example, may be disposed beneath (e.g., Z-direction) the second channel 108 and may be configured to emit light out of the second channel 108. The IR light output via the IR LED may illuminate an environment (or a portion thereof) of the device 100 for detecting motion. A light pipe 110 resides at least partially within the second channel 108 and serves to uniformly disperse the IR light into the environment. For example, the light pipe 110 may reduce hot spots of the IR light emitted by the IR LED.

The device 100 may also include a camera lens 112 coupled to or disposed within the front cover 102. As will be explained herein, a camera of the device 100 may be disposed beneath (e.g., Z-direction) the camera lens 112 for imaging an environment of the device 100. The device 100 may include a sensor lens 114, which in some instances, couples to the front cover 102. As will be explained herein, sensor(s) may be disposed behind (e.g., Z-direction) the sensor lens 114 for sensing the environment. In some instances, the sensor(s) disposed beneath the sensor lens 114 are configured to detect motion within the environment, and in response, the camera of the device 100 may capture and/or record image data/video data. In some instances, the sensor(s) are passive IR sensor(s) and/or IR receivers. Additionally, the sensor lens 114 may include a microphone port 116 through which sound is configured to pass for reaching a microphone disposed within the device 100.

In some instances, the device 100 includes a front 118, a back 120 opposite the front 118 (e.g., spaced apart in the Z-direction), a first side 122, a second side 124 opposite the first side 122 (e.g., spaced apart in the X-direction), a top 126, and a bottom 128 opposite the top 126 (e.g., spaced apart in the Y-direction). The front cover 102 and the sensor lens 114 may be disposed along the front 118, and may define a portion of an exterior surface of the device 100. The housing 104 may be disposed along the first side 122, the second side 124, the top 126, and/or the bottom 128. A rear cover 130 may couple to the housing, at the back 120.

In some instances, the camera is oriented towards the front 118 of the device 100. Additionally, the camera may be located more proximate to the first side 122 than the second side 124, and/or the top 126 than the bottom 128. In some instances, the first channel 106 is located centrally between the first side 122 and the second side 124, and/or may be located more proximate to the top 126 than the bottom 128. In some instances, the second channel 108 may be located more proximate to the second side 124 than the first side 122, and/or the top 126 than the bottom 128. Additionally, in some instances, the microphone port 116 may be located centrally between the first side 122 and the second side 124, and/or may be located more proximate to the bottom 128 than the top 126. The first channel 106, the second channel 108, the microphone port 116, the camera lens 112, and the sensor lens 114 are shown being located on the front 118 of the device 100.

Figure 2:
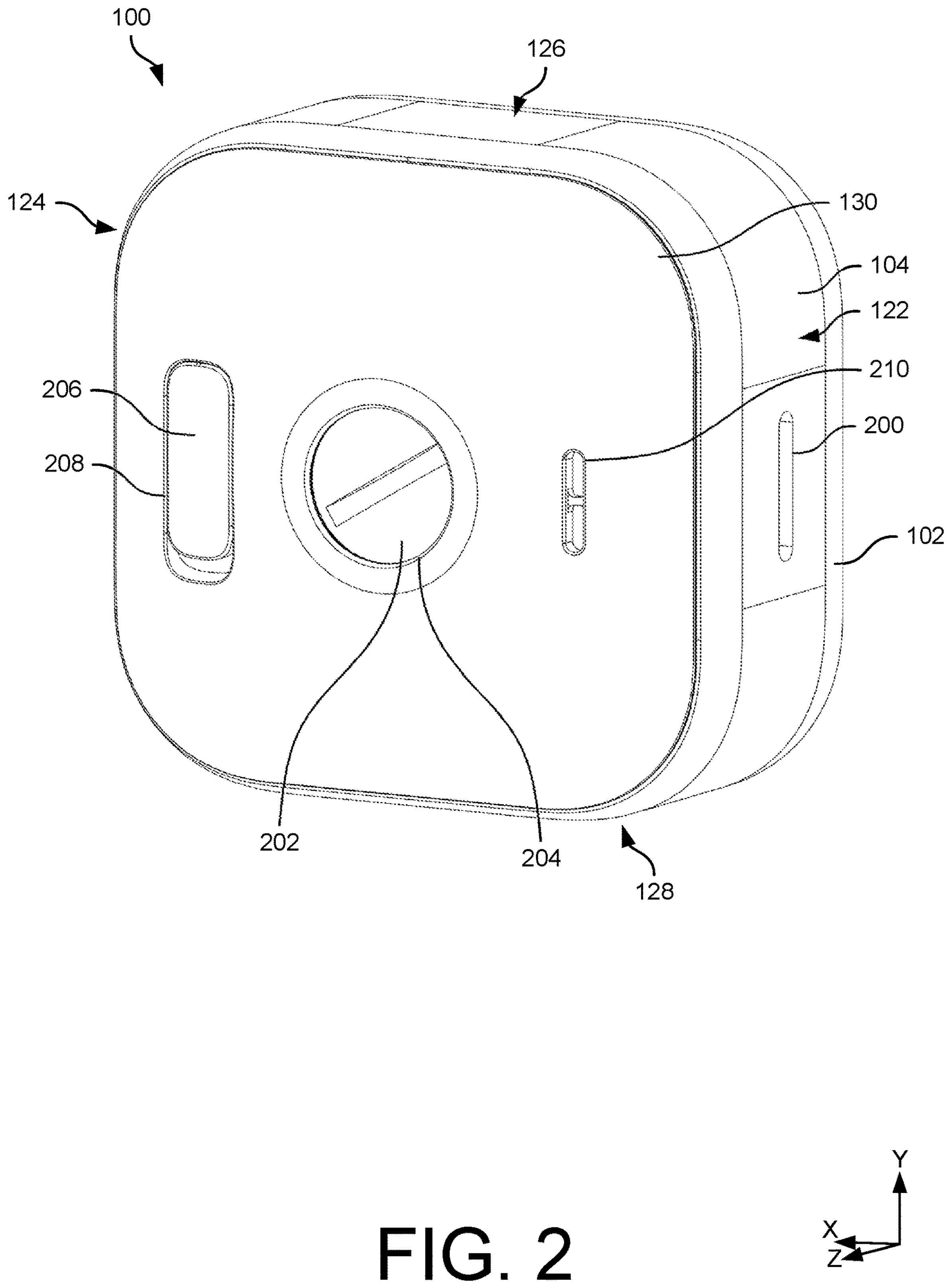
FIG. 2 illustrates a rear perspective view of the device of FIG. 1, according to examples of the present disclosure.

FIG. 2 illustrates a rear perspective view of the device 100, according to examples of the present disclosure. In some instances, the housing 104 of the device 100 includes an orifice 200 disposed along the first side 122 of the device 100. A speaker may reside beneath the orifice 200 (e.g., in the X-direction) and may be oriented to emit sound towards the orifice 200.

The device 100 includes the rear cover 130 that couples to the housing 104. For example, the front cover 102 may couple to a first side of the housing 104 (at/proximate to the front 118) and the rear cover 130 may couple to a second side of the housing 104 (at/proximate to the back 120). The rear cover 130 may include a fastening mechanism 202 that couples the rear cover 130 to the housing 104. In some instances, the fastening mechanism 202 resembles a fastener (e.g., screw) that threads into the housing 104 for coupling the rear cover 130 to the housing 104. The rear cover 130 may define a first receptacle 204 into which the fastening mechanism 202 is received. Furthermore, in some instances, a mount may be disposed within the first receptacle 204, and couple to the first receptacle 204 and/or the fastening mechanism 202 (e.g., screw head). In some instances, the mount may be used dispose the device 100 on a vertical surface (e.g., wall) and/or a horizontal surface (e.g., shelf). In some instances, the engagement between the mount and the first receptacle 204 may resemble a snap-fit or compression fit coupling. For example, portions of the mount may engage with sidewalls of the first receptacle 204.

The rear cover 130 may also include a plug 206 that resides within a second receptacle 208. The plug 206 may be disposed over (e.g., in the Z-direction) an input port of the device 100 used to communicatively couple the device 100 to one or more additional devices and/or charging the device 100. For example, removing the plug 206 may expose the input port (e.g., ethernet, power, auxiliary, USB-C, etc.). A cable may plug into the input port for charging batteries of the device 100, connecting the device 100 to one or more networks, and so forth.

The rear cover 130 may further include a pressure relief vent 210. When assembled together, such as when the fastening mechanism 202 is tightened, air within the device 100 may be vented through the pressure relief vent 210. In some instances, one or more membranes may be disposed within the rear cover 130 and/or the housing 104 to permit the ingress of liquid or other debris through the pressure relief vent 210 and into the housing 104.

In some instances, the fastening mechanism 202 (and/or the first receptacle 204) is centrally located on the rear cover 130, between the first side 122 and the second side 124, and/or between the top 126 and the bottom 128. Additionally, in some instances, the plug 206 (and/or the second receptacle 208) may be located more proximate to the second side 124, while the pressure relief vent 210 may be located more proximate to the first side 122. In some instances, the fastening mechanism 202, plug 206, and/or pressure relief vent 210 may be horizontally aligned (e.g., on the X-plane). The orifice 200, disposed at the first side 122, may additionally or alternatively be aligned with the fastening mechanism 202, plug 206, and/or pressure relief vent 210.

Figure 3:
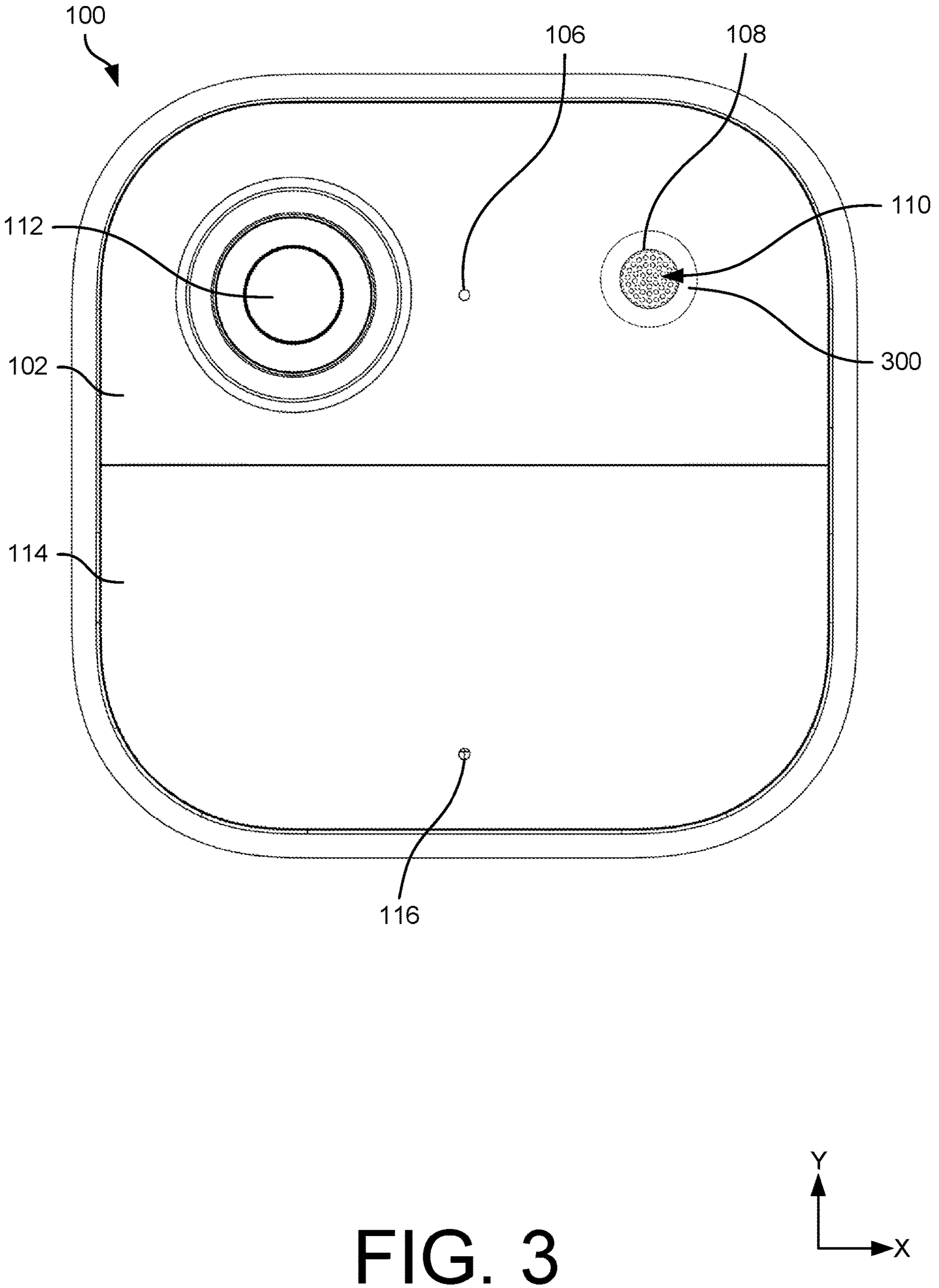
FIG. 3 illustrates a front view of the device of FIG. 1, according to examples of the present disclosure.

FIG. 3 illustrates a front view of the device 100, according to examples of the present disclosure. Introduced above in FIG. 1, the front cover 102 may define the first channel 106 for emitting light associated with an operation being performed by the device 100 (e.g., recording audio, recording video, detecting motion, etc.). Additionally, the light pipe 110 resides within the second channel 108 and serves to uniformly disperses IR light into an environment of the device 100. In some instances, a pocket or recess 300 encircles the second channel 108. The recess 300 may be formed within an exterior surface of the front cover 102.

The sensor lens 114 defines the microphone port 116 through which sound at least partially travels for reaching one or more microphone(s) disposed within the device 100. In some instances, the first channel 106 and the microphone port 116 are vertically aligned. The camera lens 112 is further shown coupled to the front cover 102. As will be explained herein, the front cover 102 may define a receptacle (e.g., channel) within which the camera lens 112 (and/or the camera) is at least partially disposed, or within which the camera lens 112 resides. In some instances, the first channel 106, the second channel 108, and/or the camera lens 112 (or the receptacle within which the camera lens 112 is at least partially disposed) may be horizontally aligned. In some instances, the first channel 106 is centrally located between the first side 122 and the second side 124. In some instances, the second channel 108 is equidistantly disposed between the first channel 106 and the second side 124. In some instances, the camera lens 112 is equidistantly disposed between the first channel 106 and the first side 122.

In some instances, the front cover 102 is non-transmissive, and the IR LED of the device 100 may emit IR light into the environment via the light pipe 110 disposed within the second channel 108. In some instances, the sensor lens 114 is transmissive to signals and/or light rays. For example, in some instances, PIR sensor(s) and/or IR receiver(s) may reside beneath the sensor lens 114 and are configured to receive light rays (e.g., radiation) emitted from sources (e.g., people, animals, etc.) and/or IR light emitted via the IR LED, respectively.

Figure 4:
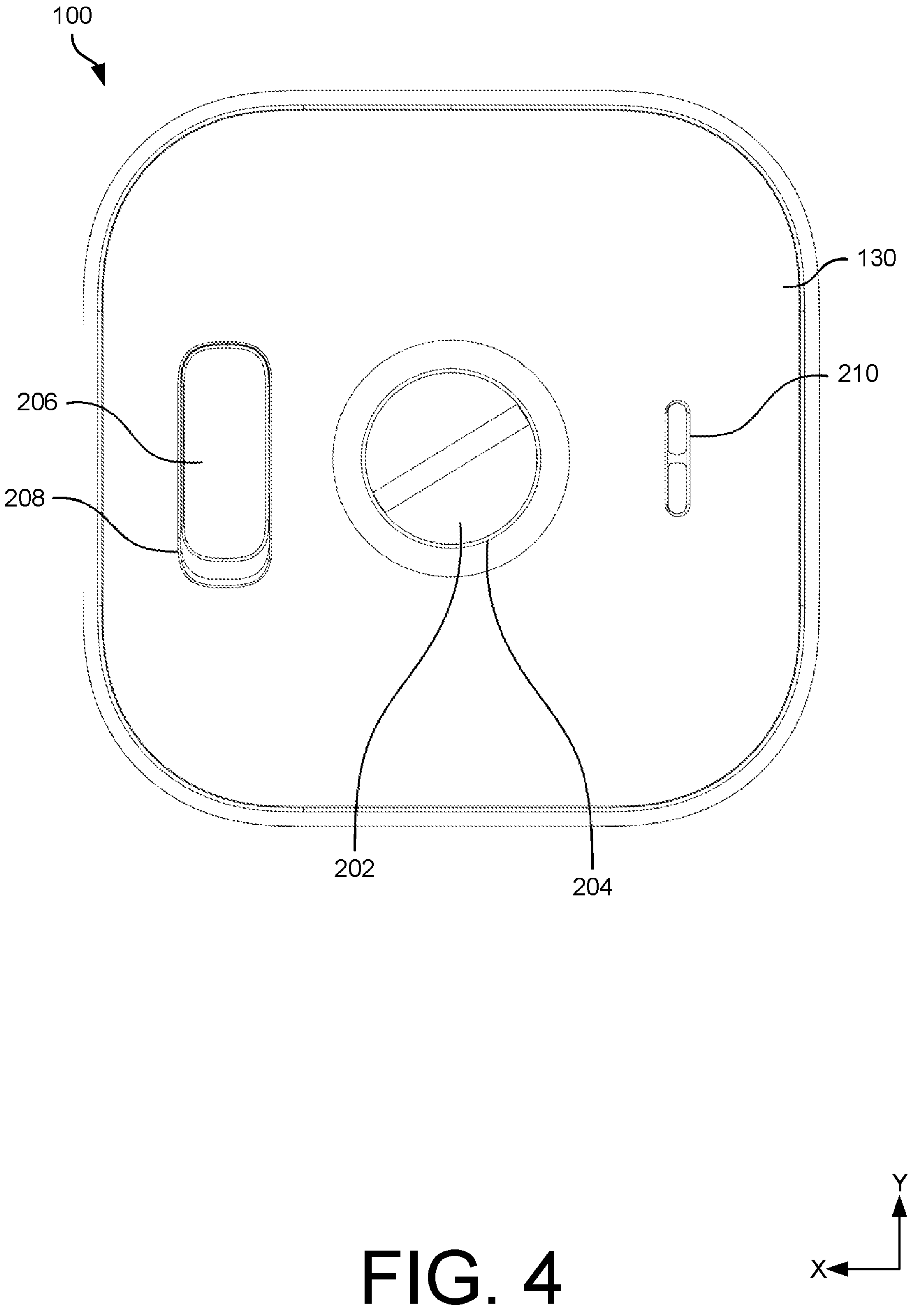
FIG. 4 illustrates a rear view of the device of FIG. 1, according to examples of the present disclosure.

FIG. 4 illustrates a rear view of the device 100, according to examples of the present disclosure. The rear cover 130 includes the fastening mechanism 202, the plug 206, the pressure relief vent 210, as well as the first receptacle 204 and the second receptacle 208. In some instances, the device 100 may include a substantially square-shape (e.g., in the X-Y plane), however, other shapes are envisioned (e.g., rectangular, hexagonal, etc.).

Figure 5A:
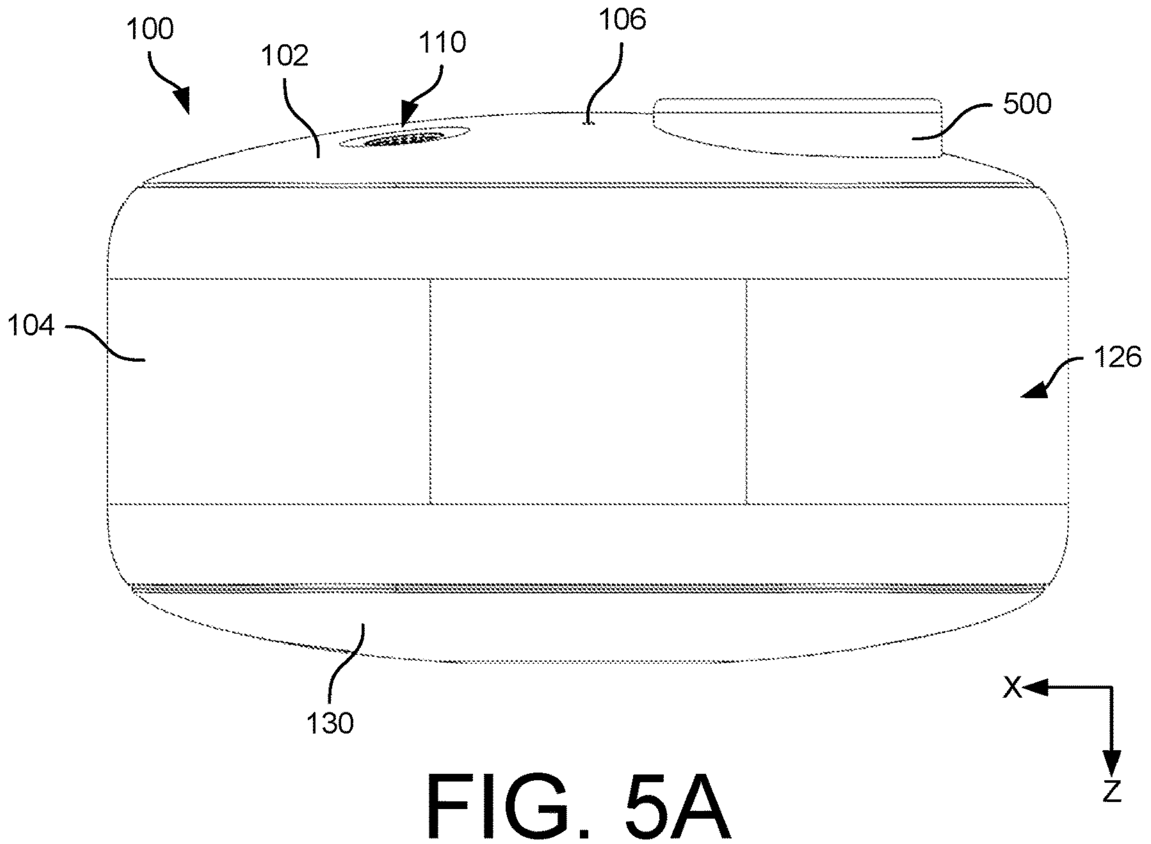
FIG. 5A illustrates a top view of the device of FIG. 1, according to examples of the present disclosure.
Figure 5B:
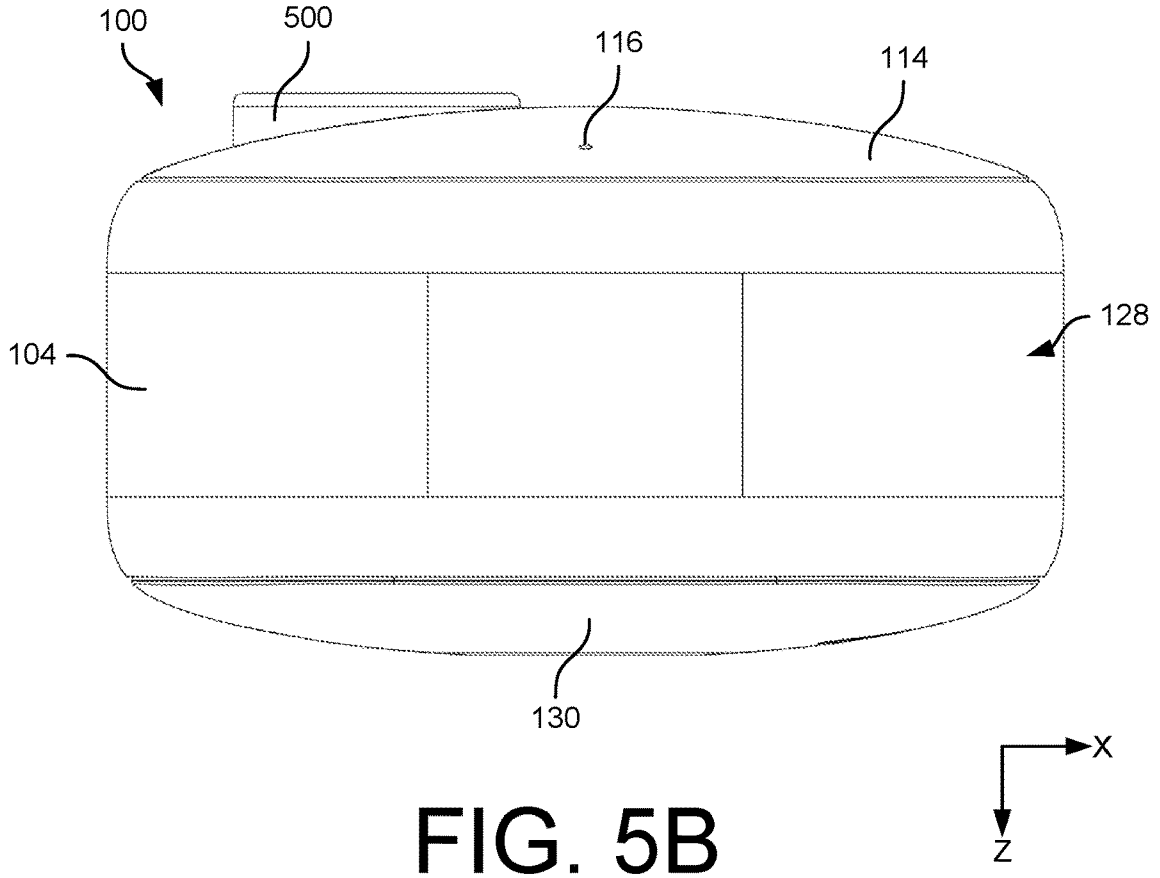
FIG. 5B illustrates a bottom view of the device of FIG. 1, according to examples of the present disclosure.

FIGS. 5A and 5B illustrate end views of the device 100, according to examples of the present disclosure. FIG. 5A illustrates a top view of the device 100, while FIG. 5B illustrates a bottom view of the device 100.

The front cover 102 is shown coupled to a first side of the housing 104 and the rear cover 130 is shown coupled to second side of the housing 104 opposite the first side of the housing 104 (e.g., spaced apart in the Z-direction). In some instances, seals, gaskets, and so forth may be interposed between the front cover 102 and the housing 104, and/or the rear cover 130 and the housing 104 to environmentally seal the device 100.

In some instances, an exterior surface of the device 100 formed by the front cover 102, the housing 104, and the rear cover 130 is substantially uniform around the device 100. The camera lens 112 may reside within a projection 500 that extends from the front cover 102. The projection 500 is shown extending (e.g., proud of) the exterior surface of the device 100. The projection 500 may orient the camera within the device 100, or the camera lens 112 normal to the camera.

As will be explained herein, a surface of the light pipe 110 oriented towards the environment (e.g., towards the front 118) may be curved to match a profile of the front cover 102. For example, between the first side 122 and the second side 124, the front cover 102 may include a curved profile. A surface of the light pipe 110 may include a curve that accommodates the curvatures of the front cover 102.

Figure 6B:
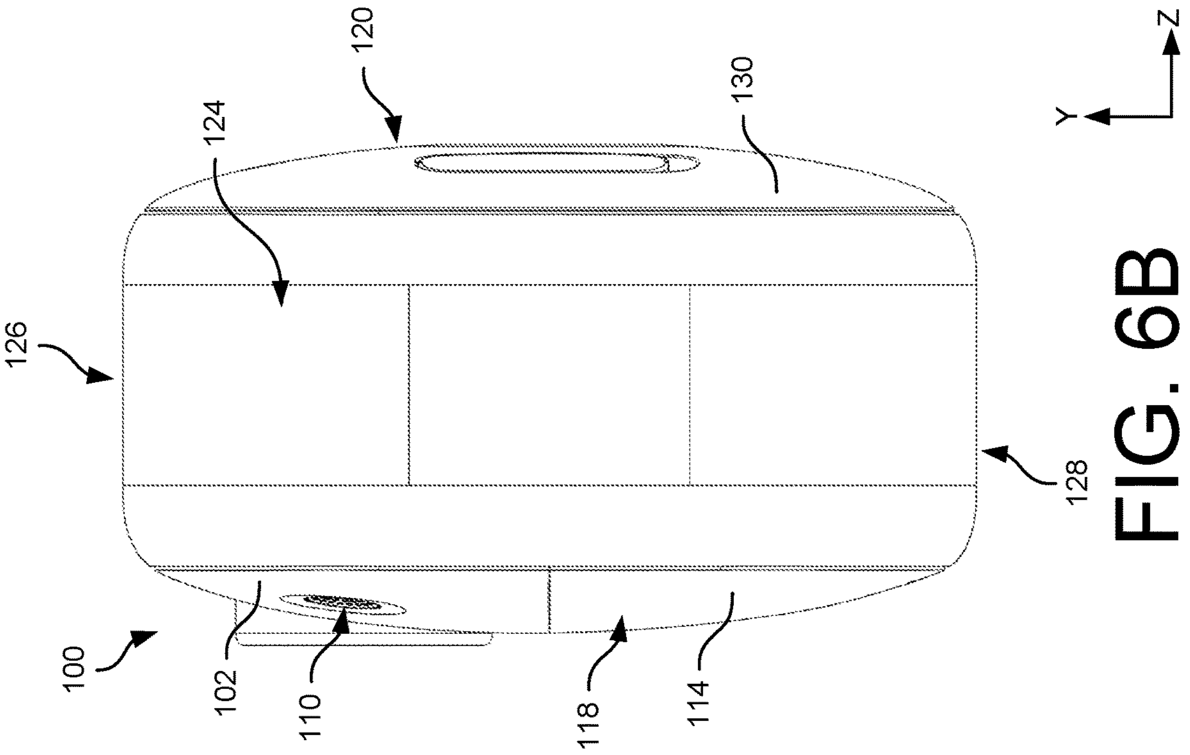
FIG. 6B illustrates a second side view of the device of FIG. 1, according to examples of the present disclosure.
Figure 6A:
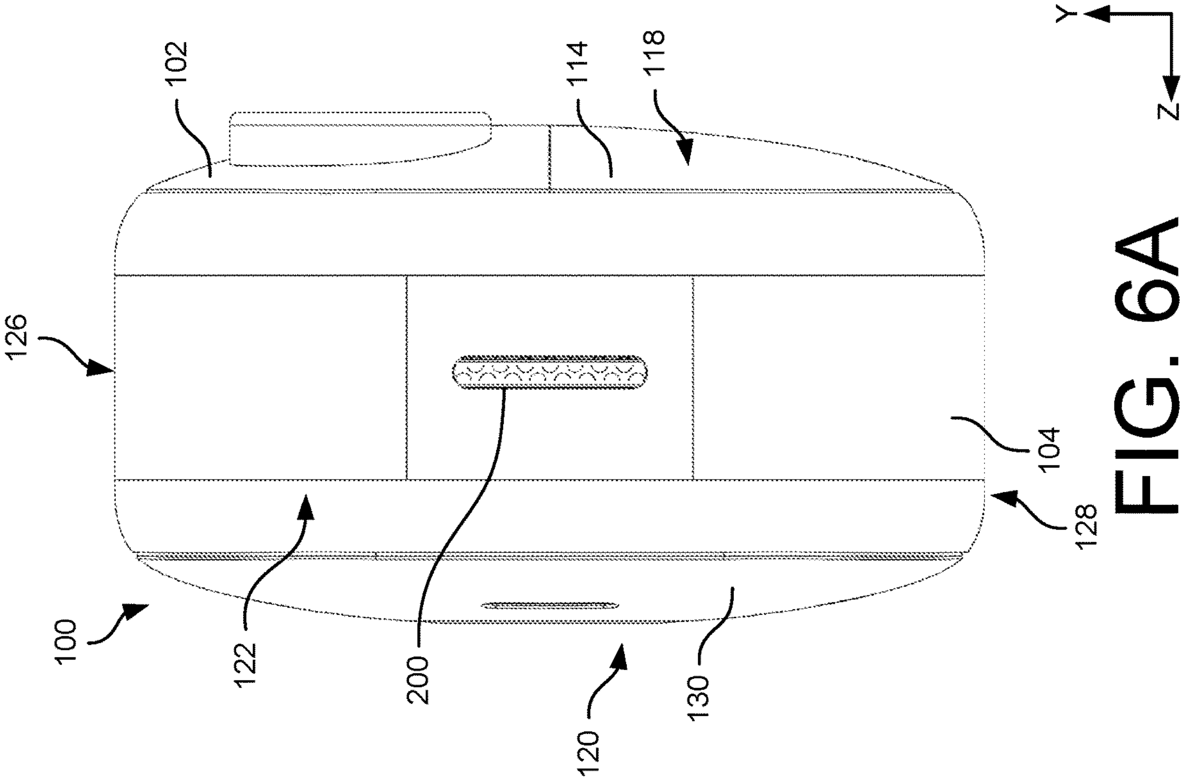
FIG. 6A illustrates a first side view of the device of FIG. 1, according to examples of the present disclosure.

FIGS. 6A and 6B illustrate side views of the device 100, according to examples of the present disclosure. FIG. 6A illustrates a view of the first side 122 the device 100, while FIG. 6B illustrates a view of the second side 124 of the device 100. The orifice 200 is shown located through the housing 104 on the first side 122. A speaker of the device 100 resides within the housing 104 and is oriented to emit sound outward from the device 100 via the orifice 200. In some instances, the orifice 200 is centrally located on the housing 104, such as between the top 126 and the bottom 128, and/or between the front 118 and the back 114. As also shown, the front cover 102 and the rear cover 130 couple to the housing 104.

Figure 7:
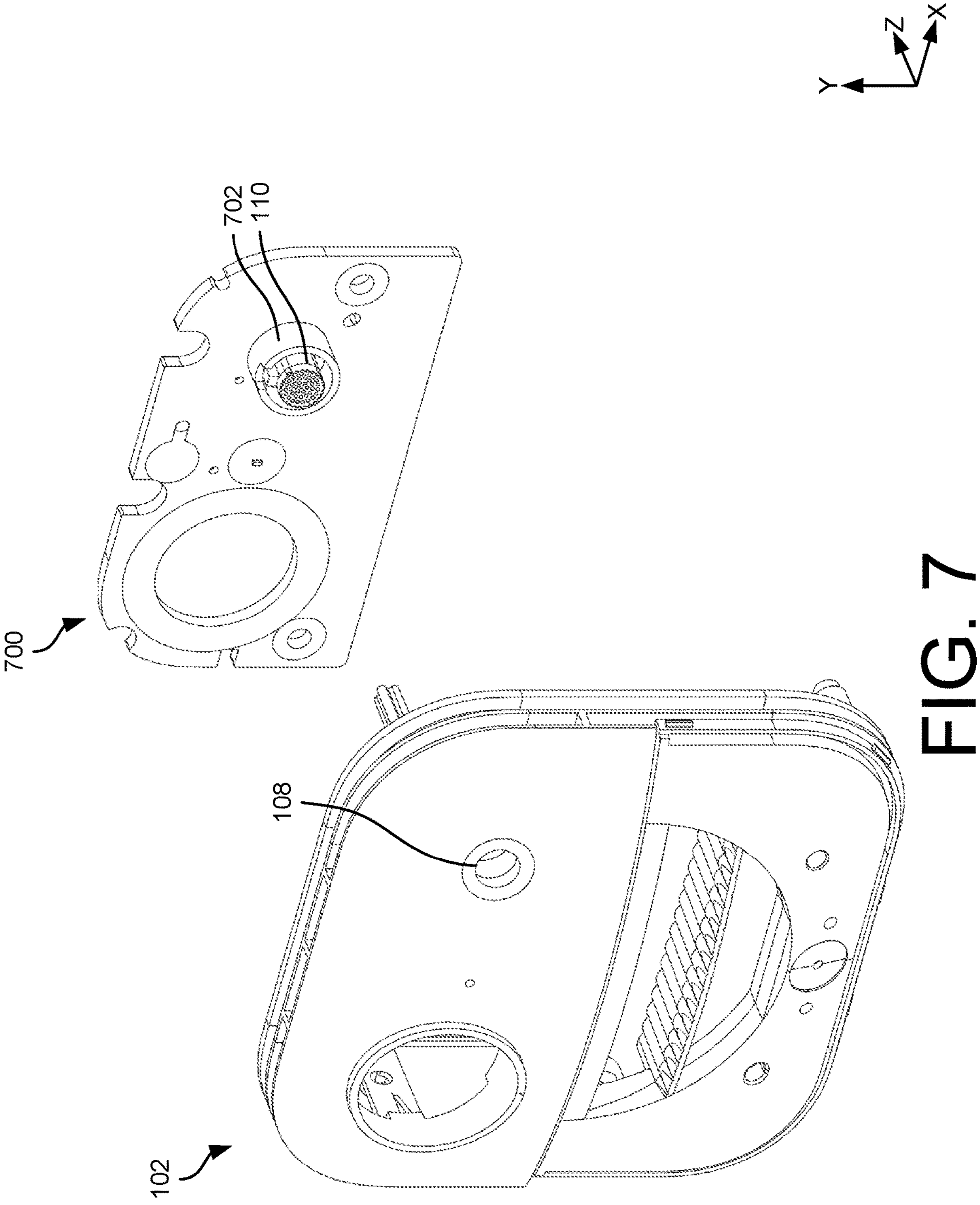
FIG. 7 illustrates a partially exploded view of the device of FIG. 1, showing an example cover and an example printed circuit board (PCB) of the device, according to examples of the present disclosure.

FIG. 7 illustrates a partially exploded view of the device 100, according to examples of the present disclosure. More particularly, FIG. 7 illustrates a printed circuit board (PCB) 700 being separated from the front cover 102. Details of the front cover 102 are discussed herein, however, the front cover 102 is configured to receive the PCB 700, or stated alternatively, the PCB 700 may couple to the front cover 102. In some instances, the light pipe 110 couples to the PCB 700. Additionally, a gasket 702 (e.g., grommet, seal, washer, etc.) may be disposed at least partially around the light pipe 110 and/or the IR LED to prevent light-bleeding and to direct IR light emitted via the IR LED out the second channel 108 formed within the front cover 102. Additional details of the PCB 700 are discussed in FIG. 12.

Figure 8A:
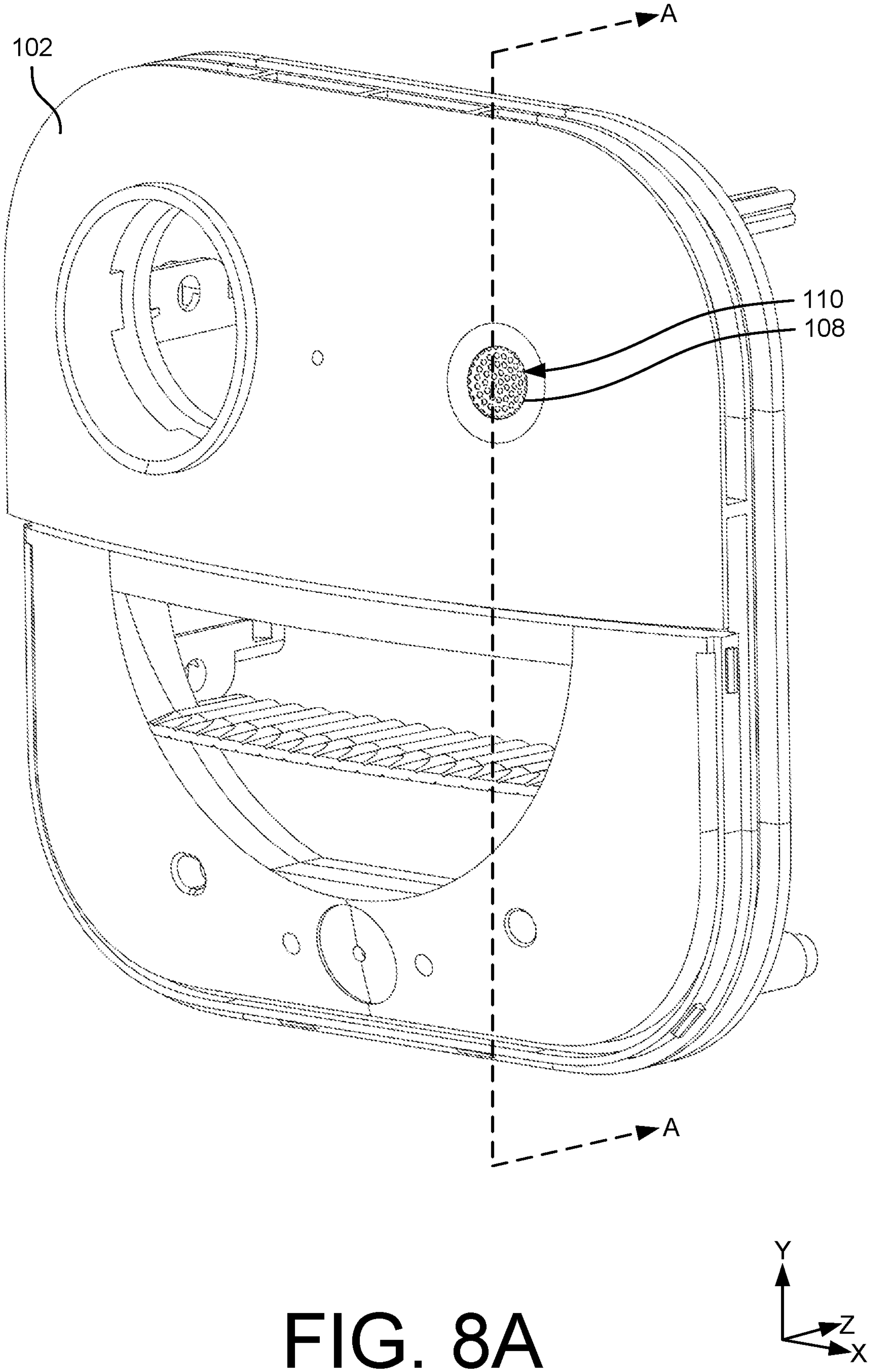
FIG. 8A illustrates a first partial view of the device of FIG. 1, showing the PCB of FIG. 7 coupled to the cover of FIG. 7, according to examples of the present disclosure.

FIGS. 8A and 8B illustrate a coupling of the PCB 700 to the front cover 102, according to examples of the present disclosure. FIG. 8A illustrates a front perspective view of front cover 102, while FIG. 8B illustrates a rear perspective view of the front cover 102, showing the PCB 700 coupled to the front cover 102. As explained herein, the light pipe 110 may be disposed at least partially within the second channel 108, and an IR LED disposed on the PCB 700 is configured to output IR light through the second channel 108. The PCB 700 may also include a connector 800 for coupling to one or more PCBs, PCBAs, and/or components within the device 100. Additional details of the front cover 102 are discussed in FIGS. 10A-10D.

Figure 9:
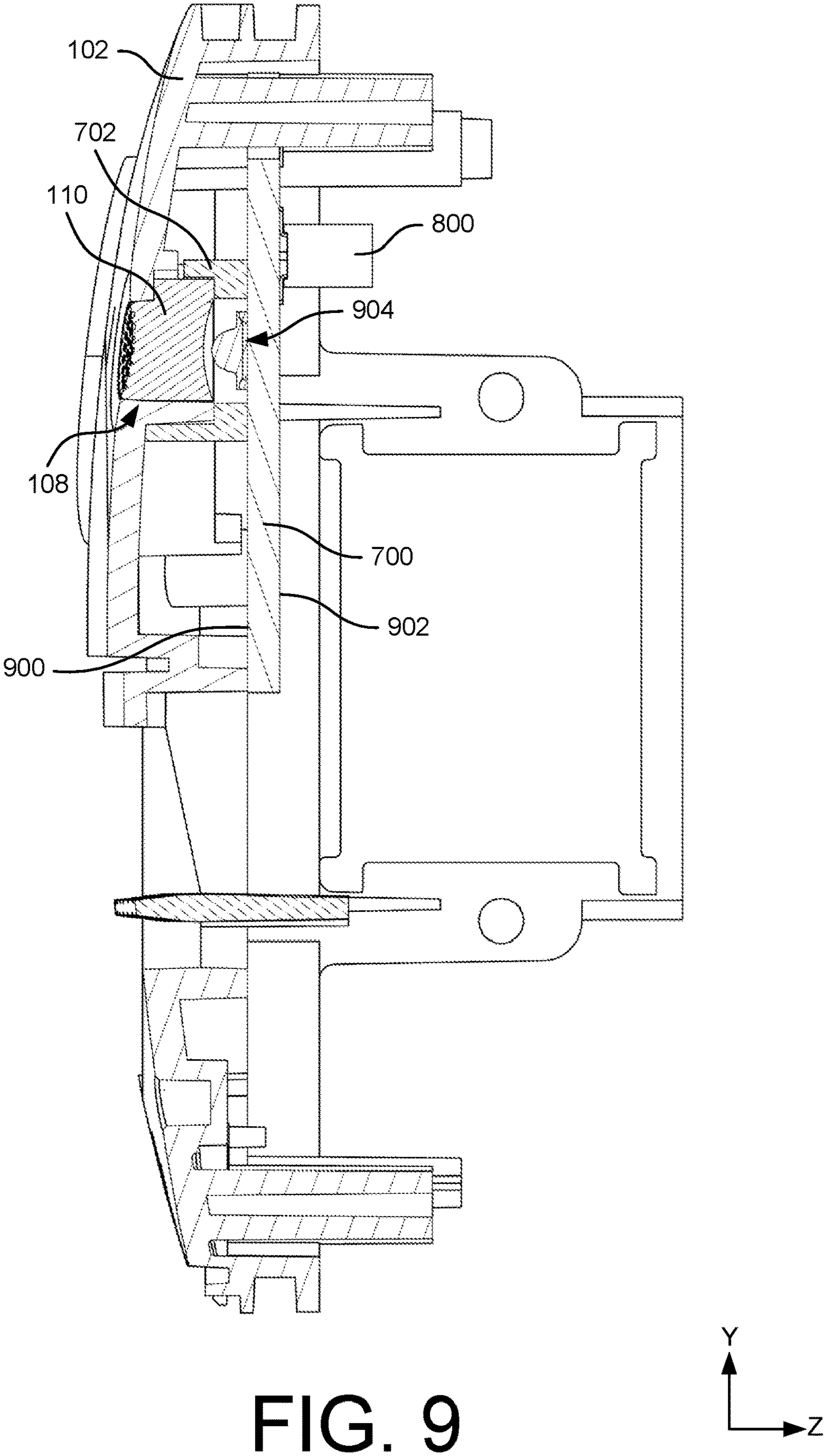
FIG. 9 illustrates a cross-sectional view of the device of FIG. 1, taken along line A-A of FIG. 8A, according to examples of the present disclosure.

A line A-A is shown in FIG. 8A, which is used to illustrate a cross-sectional view of the front cover 102 and the PCB 700 in FIG. 9.

FIG. 9 illustrates a cross-sectional view of the front cover 102 and the PCB 700, taken along line A-A of FIG. 8A. The PCB 700 may include a first side 900 and a second side 902 opposite the first side 900 (e.g., spaced apart in the Z-direction). The first side 900 may be oriented towards the front cover 102 and/or the front 118 of the device 100, while the second side 902 may be oriented towards the rear cover 130 and/or the back 120 of the device 100.

The PCB 700 includes an IR LED 904 mounted to, or otherwise disposed on, the first side 900 of the PCB 700. The connector 800 may be disposed on the second side 902 of the PCB 700. As shown, the IR LED 904 is oriented to emit IR light through the second channel 108 disposed through the front cover 102. For example, the light pipe 110 may reside in front of the IR LED 904, and may be at least partially disposed within the second channel 108. As such, the IR LED 904 is oriented to emit light through the light pipe 110 and out the second channel 108. The gasket 702, for example, may surround at least a portion of the IR LED 904 and/or the light pipe 110 such that the IR light is directed out the second channel 108 and to the exterior of the device 100. In some instances, the gasket 702 couples to, or abuts, the first side 900 of the PCB 700. Additionally, in some instances, the gasket 702 may be disposed at least partially around the light pipe 110, such as an exterior surface of the light pipe 110.

Figure 10B:
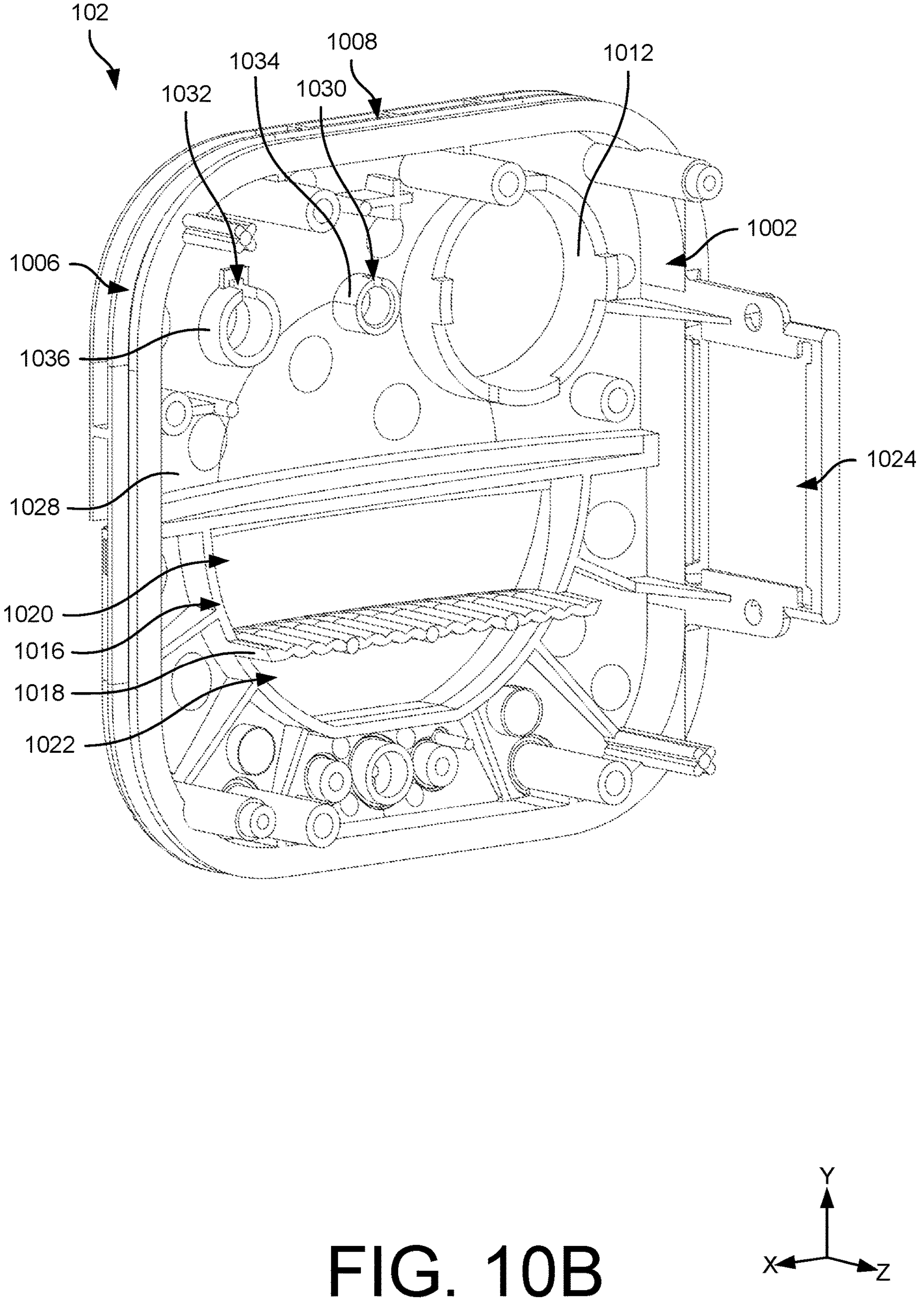
Figure 10C:
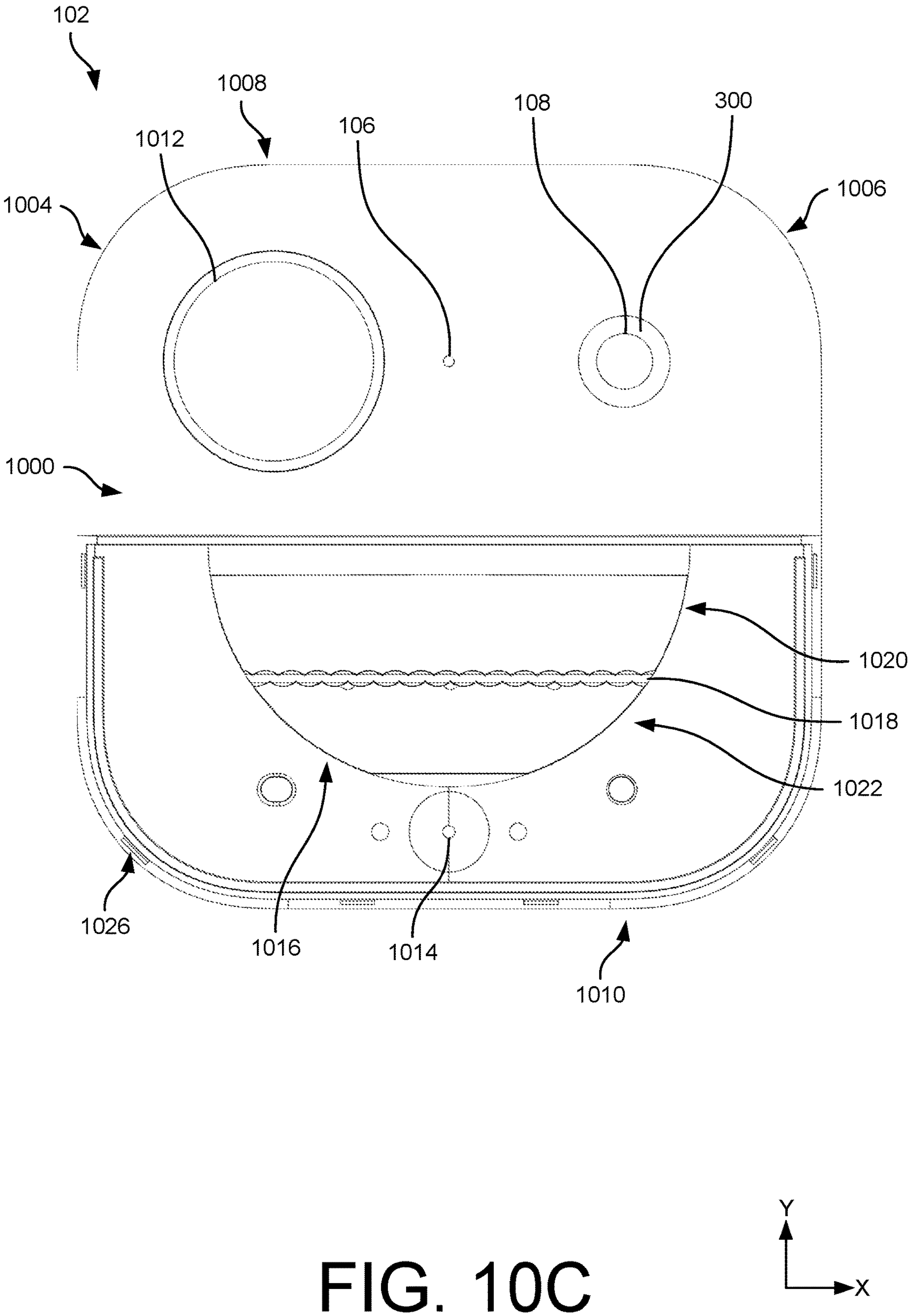
Figure 10D:
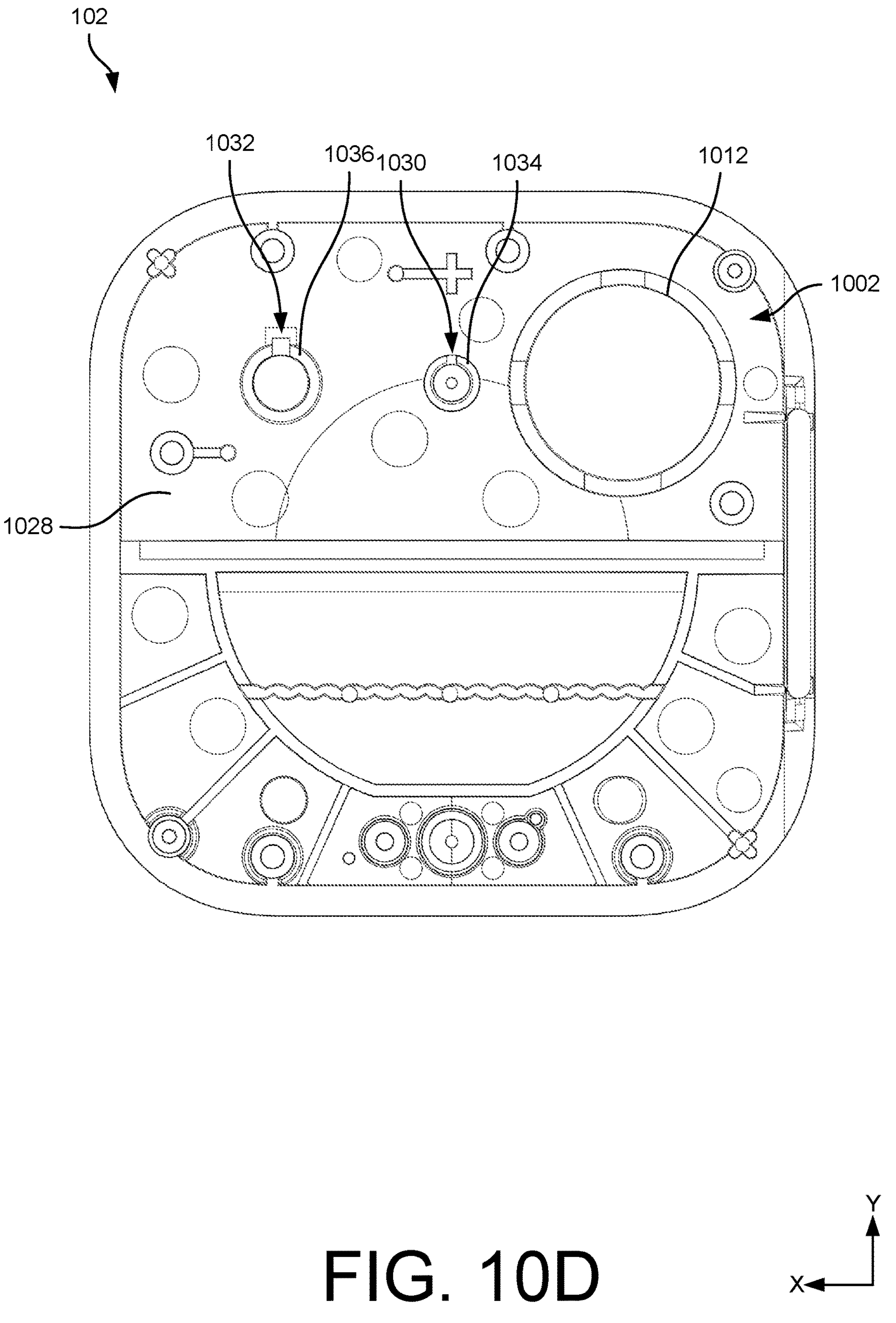

FIGS. 10A-10D illustrate various views of the front cover 102, according to examples of the present disclosure. FIG. 10A illustrates a front perspective view of the front cover 102, FIG. 10B illustrates a rear perspective view of the front cover 102, FIG. 10C illustrate a front view of the front cover 102, and FIG. 10D illustrates a rear view of the front cover 102.

The front cover 102 includes a front 1000 and a back 1002 spaced apart from the front 1000 (e.g., in the Z-direction). The front 1000 may correspond to the front 118 of the device 100. Additionally, the front cover 102 includes a first side 1004, a second side 1006 spaced apart from the first side 1004 (e.g., in the X-direction), a top 1008, and a bottom 1010 spaced apart from the top 1008 (e.g., in the Y-direction).

The front cover 102 defines the first channel 106 and the second channel 108. The first channel 106 may direct light emitted from a LED of the device 100 to the exterior of the device 100. The light, as emitted via the LED, may indicate an operational status of the device 100 (e.g., recording video, sensing motion, recording audio, etc.). The front cover 102 also defines the second channel 108 that directs light emitted from the IR LED 904 to the exterior of the device 100. The second channel 108 is sized (e.g., diameter) and configured to receive at least a portion of the light pipe 110. Additionally, the front cover 102 may include the recess 300 that at least partially encircles the second channel 108. In some instances, the front cover 102 is non-transmissive to light, whether visible or IR light. As such, the front cover 102 includes the various channels such that light is capable of traveling from the IR LED 904 (and the LED) disposed beneath the front cover 102.

The front cover 102 may also define a third channel 1012 through which a camera of the device 100 is disposed or within which the camera lens 112 resides. For example, at least a portion of the camera of the device 100 and/or the camera lens 112 may be disposed within the third channel 1012. In some instances, the first channel 106, the second channel 108, and the third channel 1012 are horizontally aligned across the front 1000 of the front cover 102.

The front cover 102 may also define a fourth channel 1014 that aligns with the microphone port 116 when the sensor lens 114 couples to the front cover 102. The fourth channel 1014 may assist in directing sound from the exterior of the device 100 to one or more microphone(s) located within the device 100. In some instances, the first channel 106 is vertically aligned with the fourth channel 1014. In some instances, the second channel 108 may be larger (e.g., in cross-sectional dimension) than the first channel 106 and/or the fourth channel 1014. Additionally, or alternatively, the third channel 1012 may be larger (e.g., in cross-sectional dimension) than the first channel 106, the second channel 108, and/or the fourth channel 1014.

In some instances, the front cover 102 defines a window 1016 through which PIR sensor(s) of the device 100 are configured to receive light rays. A divider 1018 may extend across a portion of the window 1016, so as to adjoin adjacent sidewalls of the window 1016. As shown, the window 1016 may be half-circular or half-ovular shaped. In some instances, the window 1016 includes an upper portion 1020 and a lower portion 1022. A first PIR sensor may be arranged to receive light rays via the upper portion 1020, while a second PIR sensor may be arranged to receive light rays via the lower portion 1022. In some instances, the upper portion 1020 is larger in size than the lower portion 1022. In some instances, surfaces of the divider 1018 are scalloped-shaped. The scalloped-shaped surface of the divider 1018 may reduce glare of incoming light rays being received by the first PIR sensor and the second PIR sensor, respectively.

The front cover 102 may also include a speaker receptacle 1024 that receives a speaker of the device 100. As shown, the speaker receptacle 1024 may extend from the back 1002 of the front cover 102 and/or along the first side 1004. The speaker, or a frame/speaker box of the speaker, may mount to the speaker receptacle 1024.

The front cover 102 may include first attachment mechanisms 1026 that engage or correspond to second attachment mechanisms of the sensor lens 114. The first attachment mechanisms 1026 may represent flanges, slots, tabs, keyways, and the like that engage with corresponding features on the sensor lens 114. Such engagement may secure the sensor lens 114 and the front cover 102 together. For example, the first attachment mechanisms 1026 and the second attachment mechanisms may snap together, slide together, press fit together, and so forth. The first attachment mechanisms 1026 may be disposed around at least a portion of a perimeter or periphery of the front cover 102. In some instances, adhesives or fasteners may also be used to secure the front cover 102 and the sensor lens 114 together.

The front cover 102 includes an interior surface 1028 disposed at the back 1002. In some instances, the interior surface 1028 may define slots that receive features of the light pipe 110 and/or the gasket 702. For example, proximate to the first channel 106, the interior surface 1028 may define a first slot 1030. In some instances, a flange, tab, or projection of the gasket 702 engages with the first slot 1030 for aligning the gasket 702 on the front cover 102. The engagement between the first slot 1030 and the gasket 702 may prevent the gasket 702 reorienting or otherwise repositioning within the device 100. Additionally, proximate to the second channel 108, the interior surface 1028 may define a second slot 1032. In some instances, a flange, tab, or projection of the light pipe 110 engages with the second slot 1032 for aligning the light pipe 110 on the front cover 102. The engagement between the second slot 1032 and the light pipe 110 may prevent the light pipe 110 reorienting or otherwise repositioning within the device 100, and/or may secure the light pipe 110 within the second channel 108.

Additionally, the interior surface 1028 may include receptacles that receive the gasket 702 and the light pipe 110, respectively. For example, the interior surface 1028 may define a first receptacle 1034 around which at least a portion of the gasket 702 resides. In some instances, the LED of the device 100 may reside at least partially within the first receptacle 1034. In some instances, the first slot 1030 is formed within the first receptacle 1034. A second receptacle 1036 may also be defined by the interior surface 1028. In some instances, the light pipe 110 is at least partially received within the second receptacle 1036. In some instances, the second slot 1032 is formed within the second receptacle 1036.

The receptacles may at least partially define the first channel 106 and the second channel 108. For example, the first receptacle 1034 may at least partially define the first channel 106, and the second receptacle 1036 may at least partially define the second channel 108. As shown, the first receptacle 1034 and the second receptacle 1036 may extend from the interior surface 1028, in a direction towards the back 1002.

The interior surface 1028 may also include prongs, flanges, and the like that engage with other components of the device 100, which align components of the device 100 to or within the front cover 102, and so forth. For example, the interior surface 1028 may define various other tabs, receptacles, slots, etc. for receiving components of the device 100.

Figure 11:
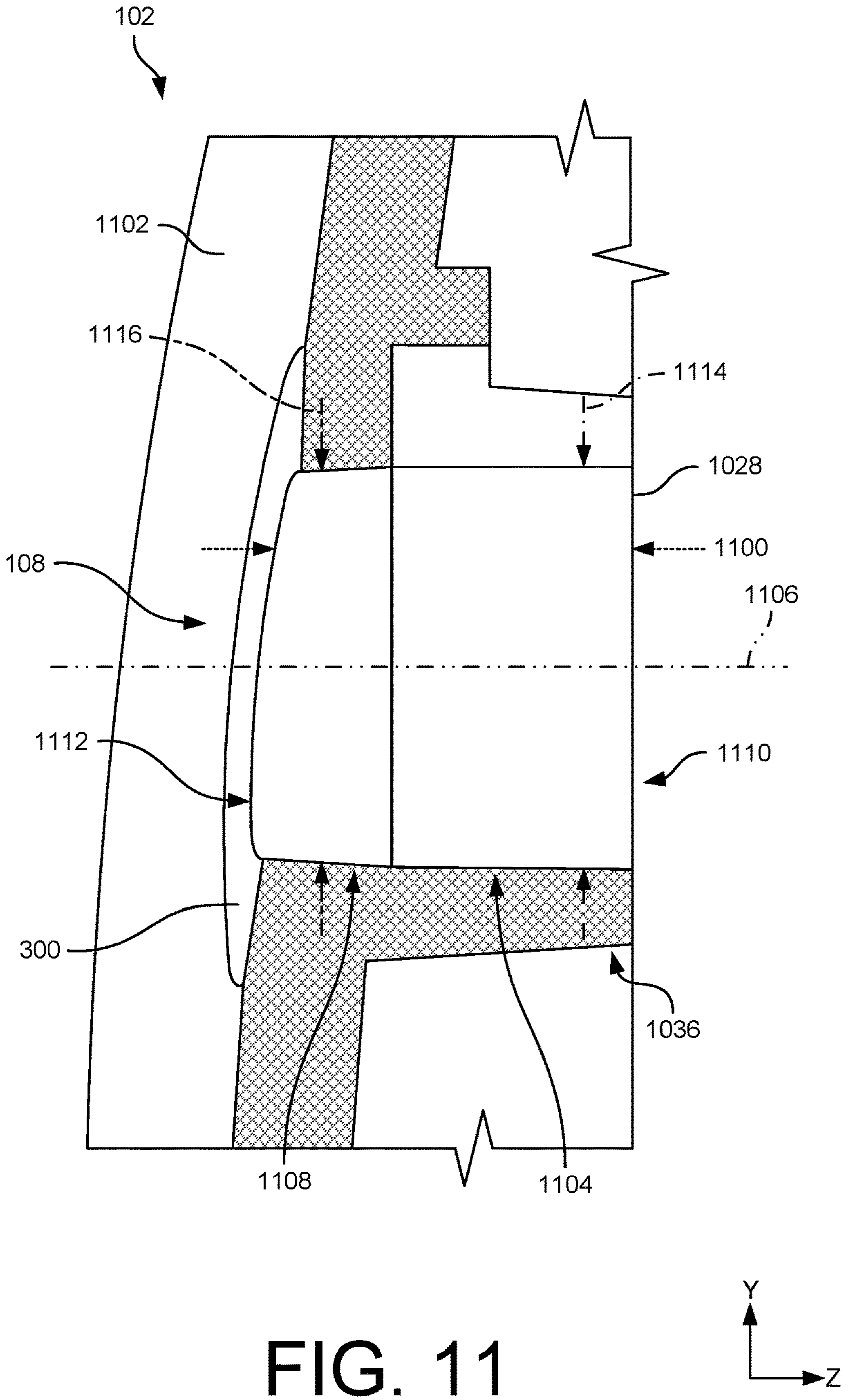
FIG. 11 illustrates a partial cross-sectional view of the cover of FIG. 7, taken along line A-A of FIG. 8A, according to examples of the present disclosure.

FIG. 11 illustrates a partial cross-sectional view of the front cover 102, taken along line A-A of FIG. 8A, showing the light pipe 110 and the gasket 702 removed, according to examples of the present disclosure.

As introduced above, a portion of the light pipe 110 may be received by the second channel 108. Additionally, given the tapered nature of the light pipe 110, the second channel 108 may be correspondingly tapered to receive the light pipe 110. For example, the second channel 108 may have a depth 1100 that extends from the interior surface 1028 to an exterior surface 1102 of the front cover 102. The depth 1100 may alternatively extend from the exterior surface 1102 to an end of the second receptacle 1036. A first portion 1104 of the depth 1100 may be substantially parallel to a central axis 1106 of the second receptacle 1036. A second portion 1108 of the depth 1100, however, may be transverse to the central axis 1106 of the second channel 108. As such, as the second channel 108 extends in a direction from the interior surface 1028 to the exterior surface 1102, the second channel 108 may taper. In some instances, the second portion 1108 may include a taper between approximately (e.g., +/−0.25 degrees) three degrees and ten degrees. For example, the first portion 1104 may be parallel to the central axis 1106, while the second portion 1108 may be between three degrees and ten degrees relative to the central axis 1106.

Stated alternatively, the second channel 108 may include a first end 1110 disposed at the interior surface 1028, and a second end 1112 disposed at the exterior surface 1102. The second channel 108 may include a first cross-sectional dimension 1114 between opposing sidewalls at the first end 1110, and may include a second cross-sectional dimension 1116 between opposing sidewalls at the second end 1112. The second cross-sectional dimension 1116 may be less than the first cross-sectional dimension 1114 to form the taper of the second channel 108. In some instances, a ratio between the second cross-sectional dimension 1116 and the first cross-sectional dimension 1114 may be less than one (e.g., 0.9).

In some instances, the first portion 1104 of the depth 1100 may be greater in length (Z-direction) than the second portion 1108 of the depth 1100. When the light pipe 110 is disposed within the second channel 108, an exterior surface of the light pipe 110 may engage with the first portion 1104 and/or the second portion 1108, respectively. In some instances, the depth 1100 may be variable given the curvature of the front 1000 of the front cover 102. The second slot 1032 if further shown for receiving a corresponding tab, flange, or projection of the light pipe 110. Moreover, the exterior surface 1102 of the front cover 102 may include the recess 300.

Figure 12:
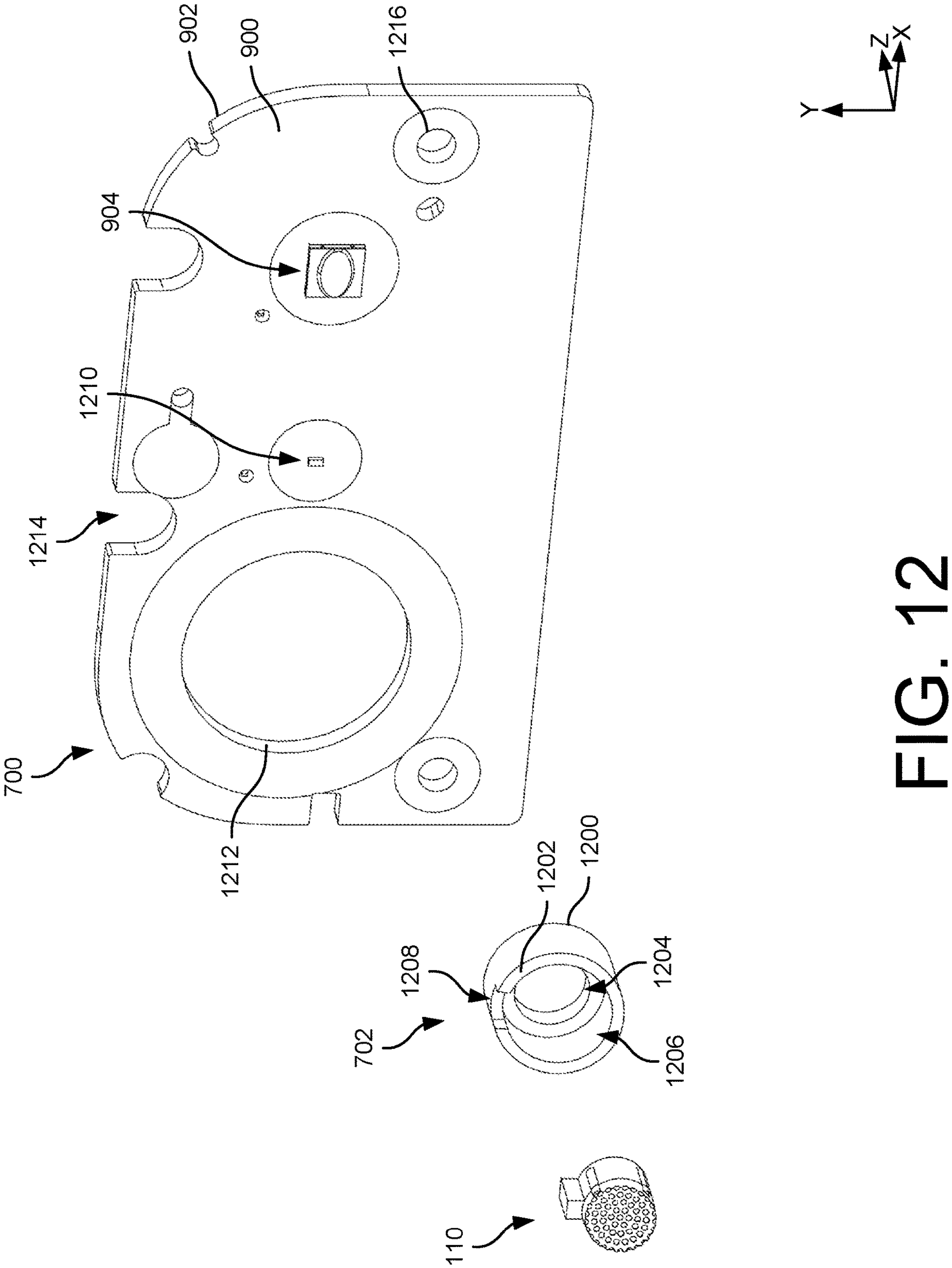
FIG. 12 illustrates a partially exploded view of the PCB of FIG. 7, according to examples of the present disclosure.

FIG. 12 illustrates an exploded view of the PCB 700, according to examples of the present disclosure. In some instances, the PCB 700 includes the first side 900 and the second side 902 opposite the first side 900 (e.g., spaced apart in the Z-direction). The first side 900 of the PCB 700 may include the IR LED 904 that emits IR light into the environment. For example, the IR LED 904 may be aligned to output IR light through the light pipe 110 and out the second channel 108 formed within the front cover 102.

In some instances, a first end 1200 of the gasket 702 may abut or be coupled to the first side 900 of the PCB 700, while a second end 1202 (spaced apart in the Z-direction) may abut or be coupled to the interior surface 1028 of the front cover 102. In some instances, the gasket 702 further includes a first pocket 1204 (e.g., channel, passageway, etc.) and a second pocket 1206 (e.g., channel, passageway, etc.). The first pocket 1204 may be disposed proximate to the first end 1200 (e.g., extends from the first end 1200), while the second pocket 1206 may be disposed proximate to the second end 1202 (e.g., extends from the second end 1202). The first pocket 1204 is shown being smaller in size (e.g., lengthwise in the Z-direction and/or cross-sectionally) than the second pocket 1206. In some instances, once the gasket 702 couples to or abuts the first side 900 of the PCB 700, the IR LED 904 may reside at least partially within the first pocket 1204.

The second pocket 1206 may receive the light pipe 110. For example, in some instances, the gasket 702 is disposed at least partially around the light pipe 110 and/or the second receptacle 1036. For example, the light pipe 110 may be inserted at least partially into the second receptacle 1036, and the gasket 702 may be disposed around the light pipe 110 and/or the second receptacle 1036. In such instances, the second pocket 1206 may be sized and shaped to receive at least a portion of the light pipe 110. For example, a first length of the light pipe 110 may be disposed within the second channel 108, while a second length of the light pipe 110 may be disposed external to the second channel 108. This second length of the light pipe 110 may be disposed within the gasket 702. In some instances, an interior surface of the second pocket 1206 contacts or abuts an exterior surface of the light pipe 110. In some instances, an end of the light pipe 110 not inserted into the second channel 108 may contact or abut a flange disposed between the first pocket 1204 and the second pocket 1206. The gasket 702 may further include a notch 1208 for receiving a flange, tab, or projection of the light pipe 110.

An LED 1210 is shown disposed on the first side 900 of the PCB 700 for emitting light through the first channel 106. In some instances, the LED 1210 emits the light through a light pipe. The second side 902 of the PCB 700 may include the connector 800 for communicatively coupling to additional PCBs or PCBAs of the device 100.

The PCB 700 may also define an opening 1212 through which at least a portion of a camera of the device 100 is disposed. For example, the camera may mount to another PCB of the device 100 and a body of the camera may be disposed through the opening 1212 such that the camera is configured to image the environment via the camera lens 112. The PCB 700 may further include various cutouts 1214 for aligning the PCB 700 within the front cover 102, vice versa. For example, the cutouts 1214 may engage with protrusions, flanges, and so forth on the interior surface 1028 of the front cover 102. Additionally, or alternatively, holes 1216 may be disposed through the PCB 700, and prongs of the front cover 102 may be received at least partially within the holes 1216 for aligning the front cover 102 and the PCB 700.

Figure 13A:
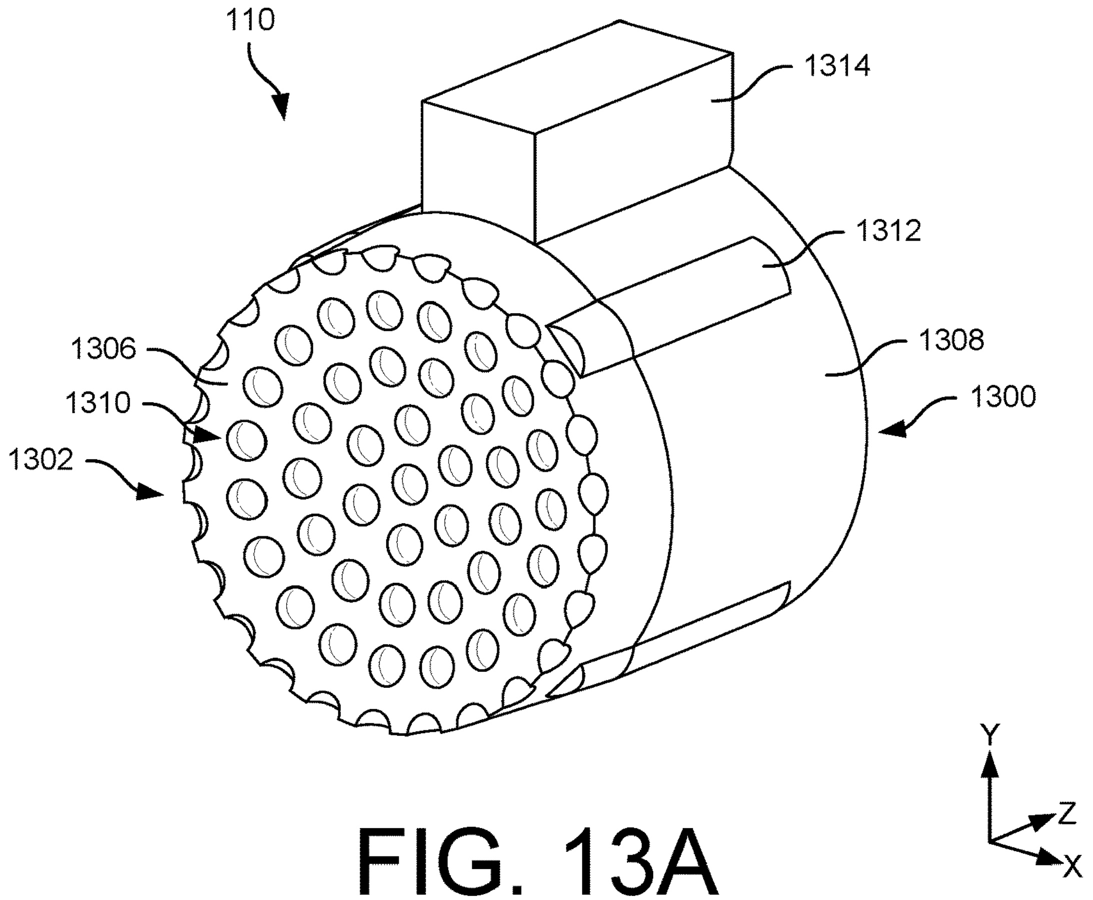
FIGS. 13A and 13B illustrate perspective views of an example light pipe of the device of FIG. 1, according to examples of the present disclosure.
Figure 13B:
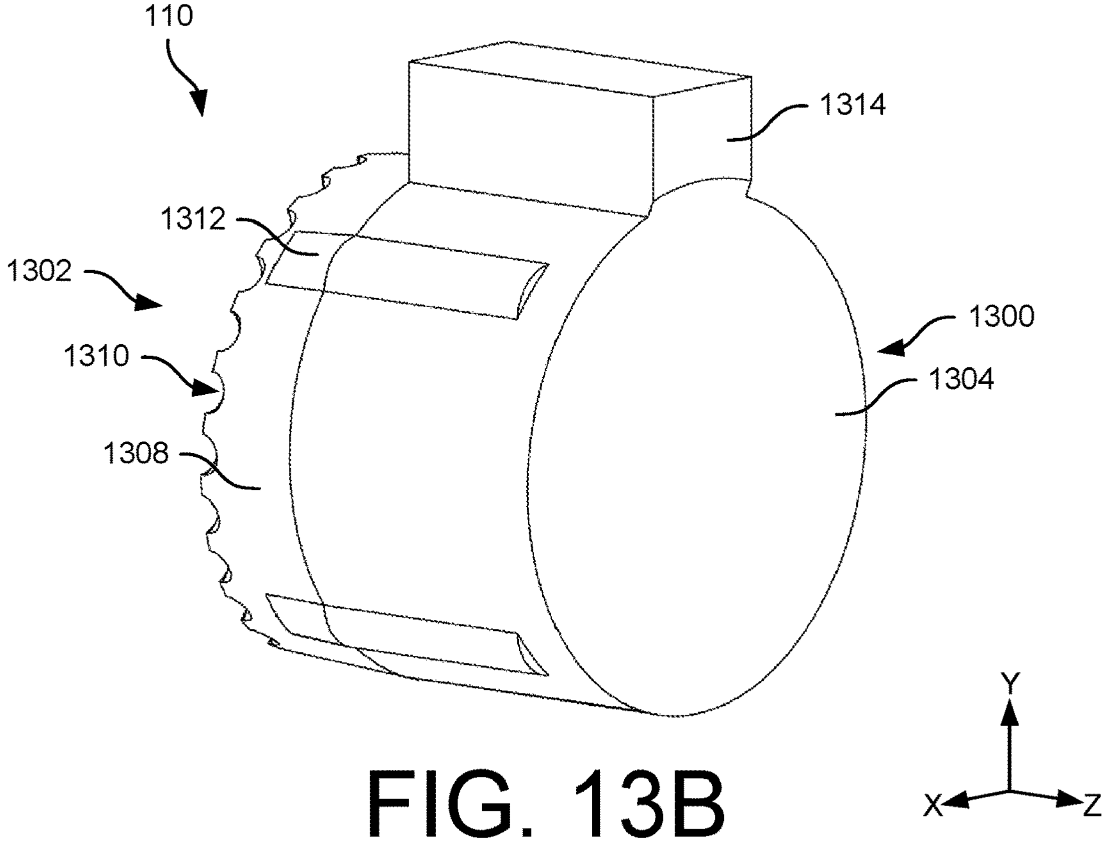

FIGS. 13A and 13B illustrate perspective views of the light pipe 110, according to examples of the present disclosure. FIG. 13A may illustrate a front perspective view of the light pipe 110, while FIG. 13B may illustrate a rear perspective view of the light pipe 110.

The light pipe 110 includes a first end 1300 and a second end 1302 opposite the first end 1300 (e.g., spaced apart in the Z-direction). The first end 1300 is oriented towards the back 120 of the device 100 (or the IR LED 904), while the second end 1302 is oriented towards the front 118 of the device 100. The first end 1300 may include a first surface 1304 (e.g., rearward facet/surface), while the second end 1302 may include a second surface 1306 (e.g., frontal facet/surface). The first end 1300 may correspond to an input surface of the light pipe 110 in which light from the IR LED 904 enters the light pipe 110, while the second end 1302 may correspond to an output surface of the light pipe 110 in which light exits the light pipe 110.

In some instances, the first surface 1304 and/or the second surface 1306 are concave shaped. For example, the first surface 1304 may be concave shaped in order to receive a portion of the IR LED 904. The second surface 1306 may be concave shaped in order to be complimentary with the exterior surface of the front cover 102. In some instances, the concaved shaped of the first surface 1304 and the second surface 1306 may diverge IR light rays emitted via the IR LED 904 to create a larger field of view. Additionally, the light pipe 110 includes an exterior surface 1308 disposed between the first end 1300 and the second end 1302.

As shown, the second surface 1306 may include one or more dimples 1310 (e.g., depressions, cavities, pockets, etc.). The dimples 1310 may be formed within the second surface 1306, and in some instances, may extend onto sides of the light pipe 110 (e.g., onto the exterior surface 1308). The dimples 1310 may assist in uniformly dispersing IR light emitted from the IR LED 904, reduce hot spots within the light pipe 110, and/or reduce hot spots of IR light emitted from the IR LED 904. In some instances, the dimples 1310 are spherically-shaped, however, the dimples 1310 may be other shapes (e.g., hexagonal, cylindrical, etc.). In some instances, the dimples 1310 have a radius of one-hundred microns. Moreover, in some instances, the dimples 1310 may be disposed according to a pattern, or may be randomly formed on the second surface 1306. Any number of dimples 1310 may be formed on the second surface 1306, and the dimples 1310 may include a different size (e.g., smaller, larger, depth, etc.) than shown.

As shown, the light pipe 110 may be substantially cylindrical in shape. In some instances, one or more ribs 1312 extend from, are disposed on, or formed from, the exterior surface 1308. The ribs 1312, for example, may engage with the interior surface of the second channel 108. For example, when the light pipe 110 is inserted into the second channel 108, the ribs 1312 may form a compression fit with the second channel 108. Any number of the ribs 1312 may be included, and in some instances, the ribs 1312 may be equidistantly disposed around the exterior surface 1308.

The light pipe 110 further includes a flange 1314 (e.g., projection, tab, etc.) that extends from, is disposed on, or is formed from the exterior surface 1308. The flange 1314 may be received within the second slot 1032 of the second receptacle 1036, for example, for securing the light pipe 110 to the front cover 102.

Figure 14B:
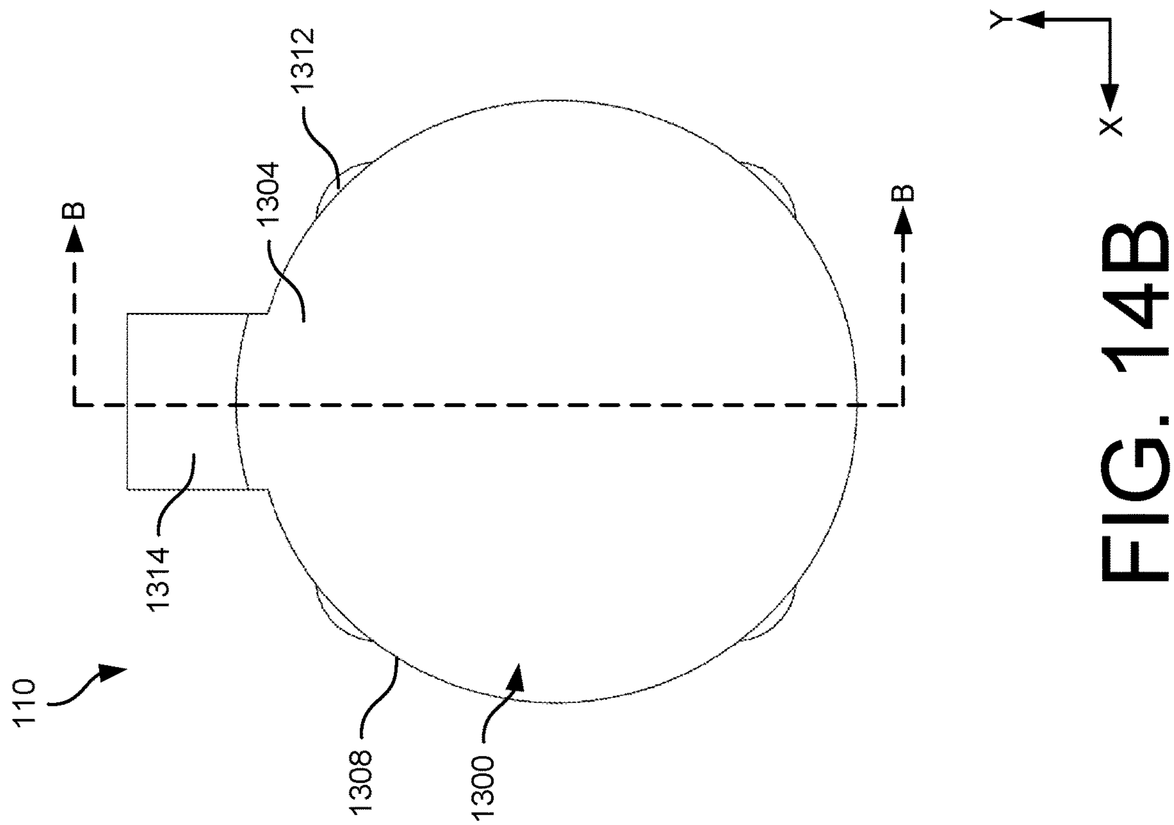
FIGS. 14A and 14B illustrate end views of the light pipe of FIGS. 13A and 13B, according to examples of the present disclosure.
Figure 14A:
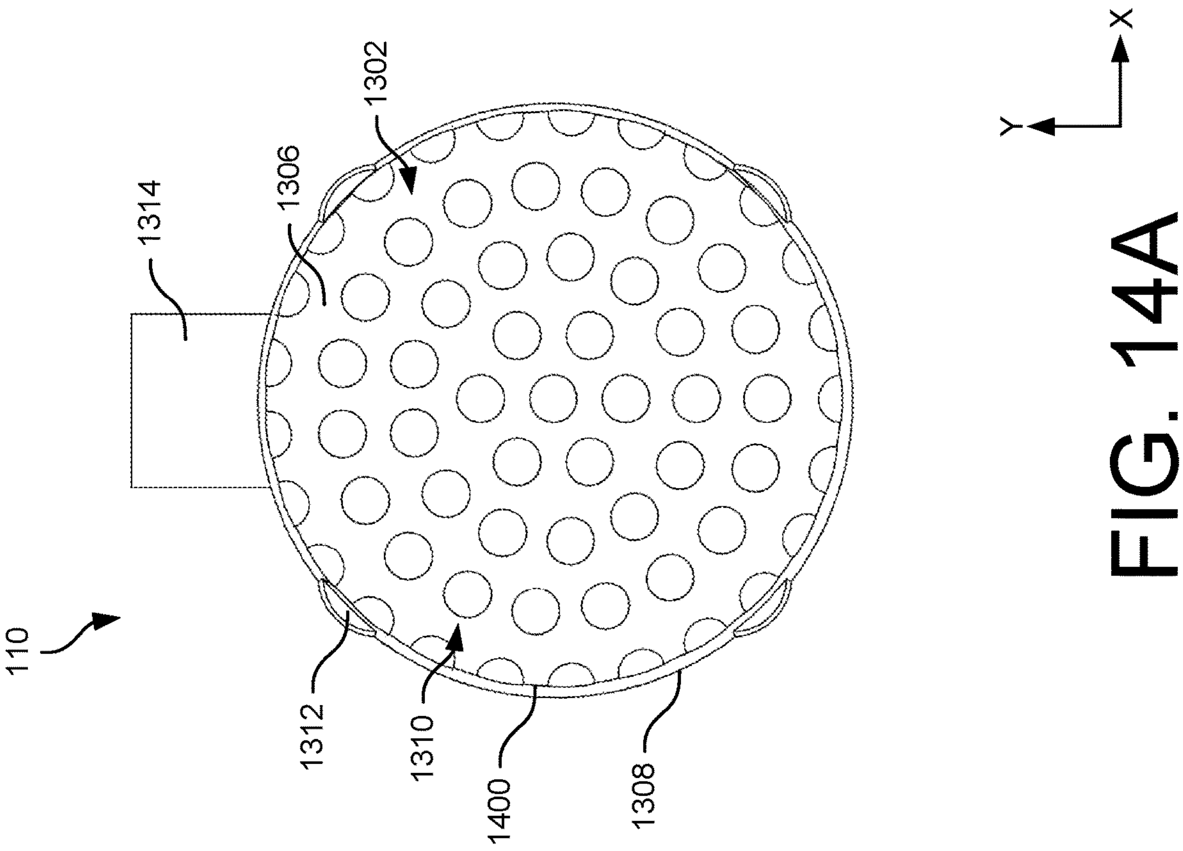

FIGS. 14A and 14B illustrate end views of the light pipe 110, according to examples of the present disclosure. FIG. 14A illustrate an end view of the second end 1302, and FIG. 14B illustrates an end view of the first end 1300.

The second surface 1306 at the first end 1300 includes the dimples 1310. The dimples 1310 are shown being circular in shape and are formed within the second surface 1306 (e.g., extend into light pipe 110 in Z-direction). In some instances, the second end 1302 includes a perimeter 1400, and along the perimeter 1400, the dimples 1310 may be half-circular or half-spherically shaped. Although the dimples 1310 are shown having the same size and/or shape, in some instances, the light pipe 110 may include different combinations of sized and shaped dimples 1310. The first end 1300 (or the first surface 1304) and the second end 1302 (or the second surface 1306) may be concave shaped.

The flange 1314 and the ribs 1312 are shown extending from the exterior surface 1308. In some instances, the flange 1314 is disposed along a top of the light pipe 110, and the ribs 1312 are radially disposed about the exterior surface 1308 (e.g., about the Z-axis). In some instances, the light pipe 110 includes four of the ribs 1312, however, the light pipe 110 may include less than or more than four of the ribs 1312. A line B-B is further shown extending through the light pipe 110 in FIG. 14B, which is used to illustrate a cross-sectional view of the light pipe 110 in FIG. 16.

In some instances, and as will be explained herein, the taper of the light pipe may have a ratio of 0.9. For example, the first end 1300 may have a first cross-sectional dimension and the second end 1302 may have a second cross-sectional dimension. The ratio of the second cross-sectional dimension to the first cross-sectional dimension may be 0.9.

Figure 15A:
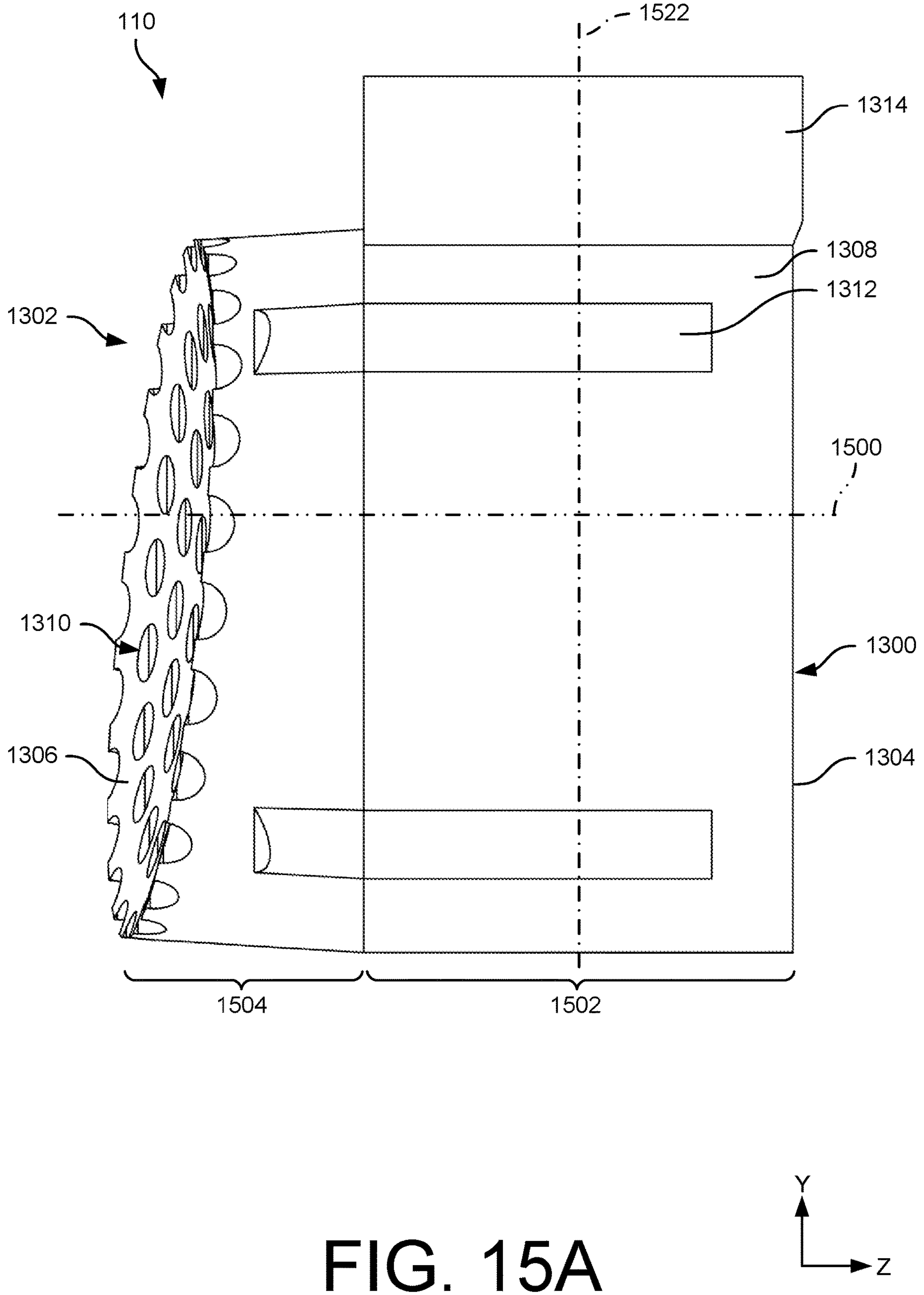
FIGS. 15A-15D illustrate side views of the light pipe of FIGS. 13A and 13B, according to examples of the present disclosure.
Figure 15B:
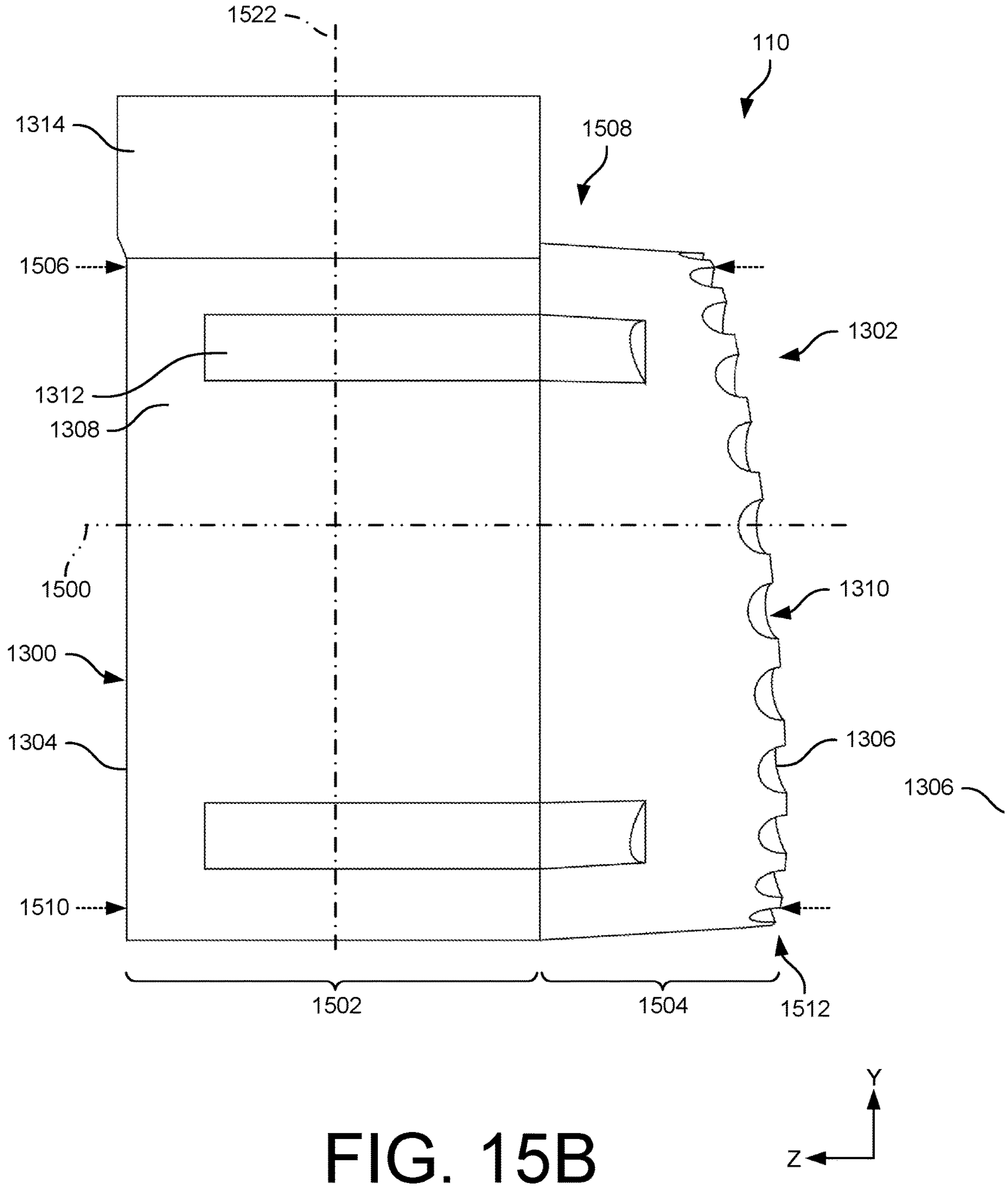
Figure 15C:
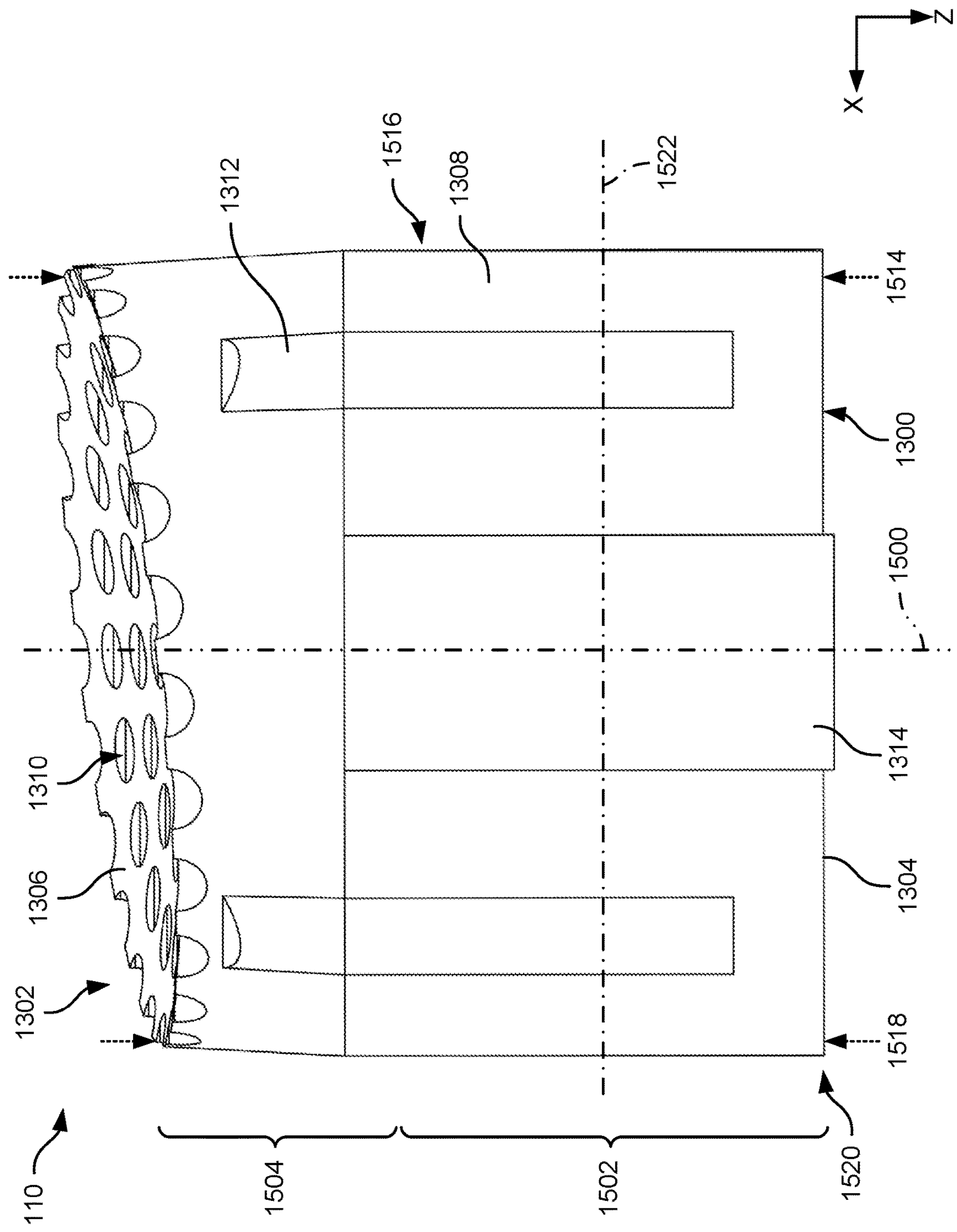
Figure 15D:
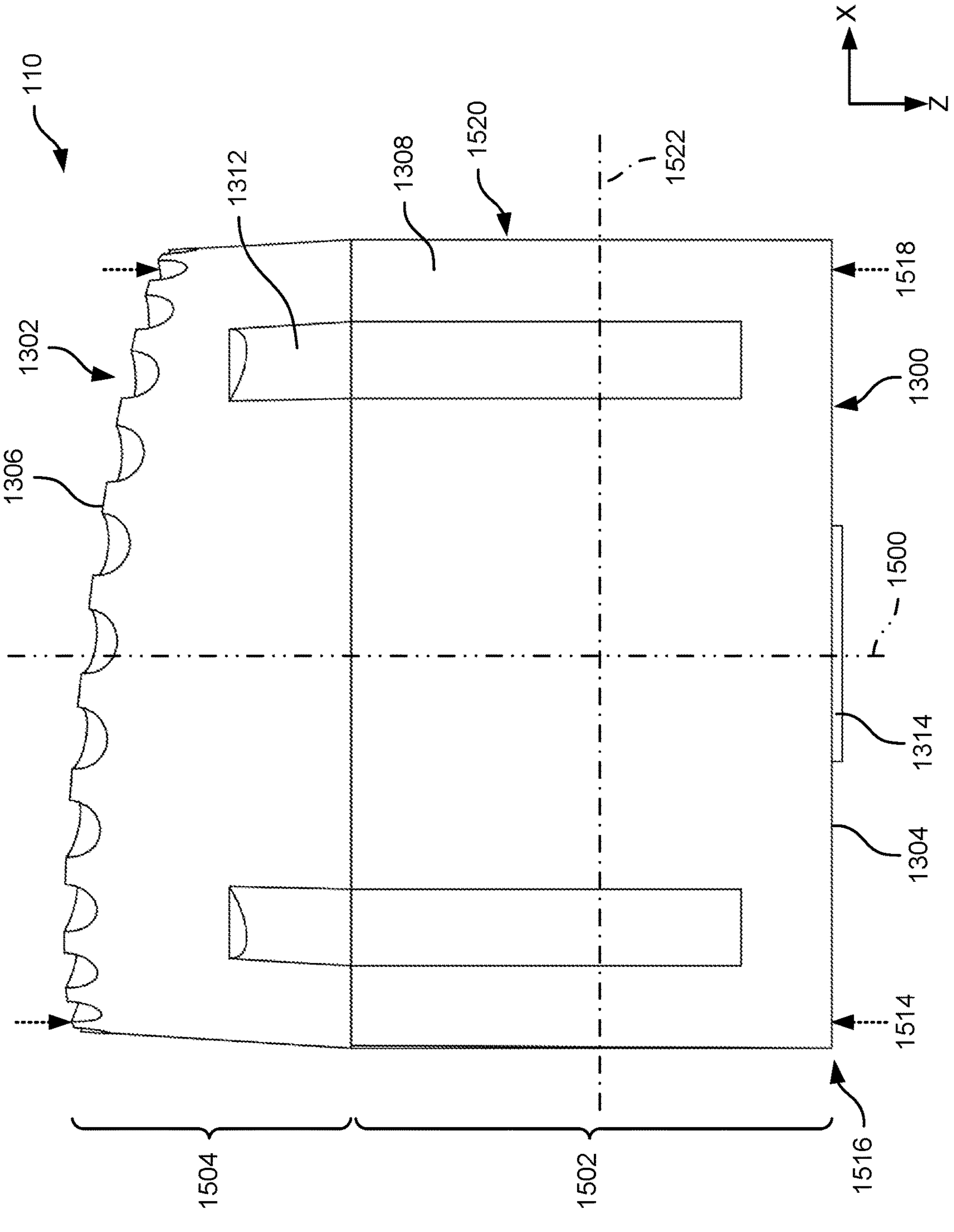

FIGS. 15A-15D illustrate various side views of the light pipe 110, according to examples of the present disclosure. FIG. 15A illustrates a first side view of the light pipe 110, FIG. 15B illustrates a second side view of the light pipe 110 (opposite the first side view), FIG. 15C illustrates a top view of the light pipe 110, and FIG. 15D illustrates a bottom view of the light pipe 110.

The light pipe 110 extends between the first end 1300 and the second end 1302. The light pipe 110 includes a length that extends along a central horizontal axis 1500 (or plane) of the light pipe 110. In some instances, the first end 1300 may be disposed perpendicular to the central horizontal axis 1500, while the second end 1302 may be transverse to the central horizontal axis 1500. For example, the second end 1302 (or the second surface 1306), may be complimentary to the curvature of the front cover 102. Therefore, given the curved nature of the second end 1302, the length of the light pipe 110 may be variable.

In some instances, the length (or more generally, the light pipe 110) includes a first portion 1502 and a second portion 1504. The first portion 1502 may extend from the first end 1300 in a direction towards the second end 1302. The second portion 1504 may extend from the second end 1302 in a direction towards the first end 1300 (or from an end of the first portion 1502 to the second end 1302). In some instances, the first portion 1502 may have a length that is greater than a length of the second portion 1504.

As shown, the second portion 1504 may include a taper. In some instances, the taper may increase a viewing angle of the IR light emitted from the IR LED 904. The taper may accommodate, or be complimentary to, the taper included within the second portion 1108 of the second channel 108. That is, the second portion 1504 of the light pipe 110 may reside within the second portion 1108 of the second channel 108. In some instances, the taper may be relative to the first portion 1502, or the central horizontal axis 1500. For example, in some instances, the second portion 1504 may taper inwards, towards the central horizontal axis 1500, between approximately (e.g., +/−0.25 degrees) three degrees and ten degrees. For example, an outer perimeter of the first portion 1502 may be parallel to the central horizontal axis 1500, while an outer perimeter of the second portion 1504 may be tapered between three degrees and ten degrees relative to the central horizontal axis 1500. In some instances, the taper of the second portion 1504 may begin at an end of the first portion 1502. Another way to express the taper may be in terms of a ratio. For example, the first end 1300 may have a first cross-sectional dimension and the second end 1302 may have a second cross-sectional dimension. The ratio of the second cross-sectional dimension to the first cross-sectional dimension may be 0.9.

As introduced above, the second surface 1306 may also curve in order to be complimentary (e.g., flush) with the exterior surface 1102 of the front cover 102. Here, in some instances, a length of the light pipe 110 may be different between sides, a top, and/or a bottom. For example, in reference to FIG. 15B, the light pipe 110 may include a first length 1506 disposed at a top 1508 of the light pipe 110. The first length 1506 may extend in a direction along the central horizontal axis 1500, at the top 1508, and between the first surface 1304 and the second surface 1306 (or the first end 1300 and the second end 1302). The light pipe 110 may include a second length 1510 disposed at a bottom 1512 of the light pipe 110 (e.g., spaced apart from the top 1508 in the Y-direction). The second length 1510 may extend in a direction along the central horizontal axis 1500, at the bottom 1512, and between the first surface 1304 and the second surface 1306 (or the first end 1300 and the second end 1302). The second length 1510 may be greater than the first length 1506. In such instances, the length of the taper of the second portion 1504 at the bottom 1512 of the light pipe 110 may be greater than the length of the taper of the second portion 1504 at the top 1508 of the light pipe 110.

Additionally, in reference to FIG. 15C, the light pipe 110 may include a third length 1514 disposed at a first side 1516 of the light pipe 110. The third length 1514 may extend in a direction along the central horizontal axis 1500, at the first side 1516, and between the first surface 1304 and the second surface 1306 (or the first end 1300 and the second end 1302). The light pipe 110 may include a fourth length 1518 disposed at a second side 1520 of the light pipe 110 (e.g., spaced apart from the first side 1516 in the X-direction). The fourth length 1518 may extend in a direction along the central horizontal axis 1500, at the second side 1520, and between the first surface 1304 and the second surface 1306 (or the first end 1300 and the second end 1302). In some instances, the fourth length 1518 may be less than the third length 1514. In such instances, the length of the taper of the second portion 1504 at the first side 1516 of the light pipe 110 may be greater than the length of the taper of the second portion 1504 at the second side 1520 of the light pipe 110. Moreover, in some instances, the third length 1514 may be greater than the first length 1506 and/or the second length 1510. Additionally, in some instances, the fourth length 1518 may be less than the first length 1506 and/or the second length 1510.

In FIGS. 15A and 15B, from the top 1508 to the bottom 1512, the second surface 1306 is shown extending in a direction away from a central vertical axis 1522 (or plane) of the light pipe 110. For example, the second surface 1306 may curve away from the central vertical axis 1522, from the top 1508 to the bottom 1512. In doing so, the second length 1510 is greater than the first length 1506. Likewise, in FIGS. 15C and 15D, from the first side 1516 to the second side 1520, the second surface 1306 is shown extending in a direction towards the central vertical axis 1522. For example, the second surface 1306 may curve towards from the central vertical axis 1522, from the first side 1516 to the second side 1520. In doing so, the third length 1514 is greater than the fourth length 1518. The curved nature of the second surface 1306 is complimentary to the exterior surface 1308 of the front cover 102. In some instances, the second surface 1306 may curve in one or more direction, such as from the top 1508 to the bottom 1512, and from the first side 1516 to the second side 1520.

However, even though the second portion 1504 may have a variable length, the second portion 1504 may include the same taper. In some instances, the first portion 1502 may include a first cross-sectional dimension (e.g., in the X and/or Y-direction) and the second portion 1504 may include a second cross-sectional dimension (e.g., in the X and/or Y-direction) that is smaller than the first cross-sectional dimension. The second cross-sectional dimension may also be variable given the differing lengths of the light pipe 110 at the top 1508, the bottom 1512, the first side 1516, and the second side 1520.

The light pipe 110 is also shown including the ribs 1312 and the flange 1314. In some instances, the ribs 1312 extend between the first portion 1502 and the second portion 1504. However, in some instances, the ribs 1312 may only be disposed on the exterior surface 1308 along the first portion 1502 or the second portion 1504. In some instances, the ribs 1312 extend in a direction along the central horizontal axis 1500. When the light pipe 110 is inserted into the second channel 108, the ribs 1312 engage with the second channel 108 to form a compression fit to couple the light pipe 110 to the front cover 102. The flange 1314, in some instances, may only be disposed on the first portion 1502. The flange 1314 is configured to be received with the second slot 1032 for aligning and orienting the light pipe 110 on or within the front cover 102.

The dimples 1310 are formed on the second surface 1306, and may extend onto the exterior surface 1308 at or along the second portion 1504. The first surface 1304 and the second surface 1306 may also be concave-shaped.

Figure 16:
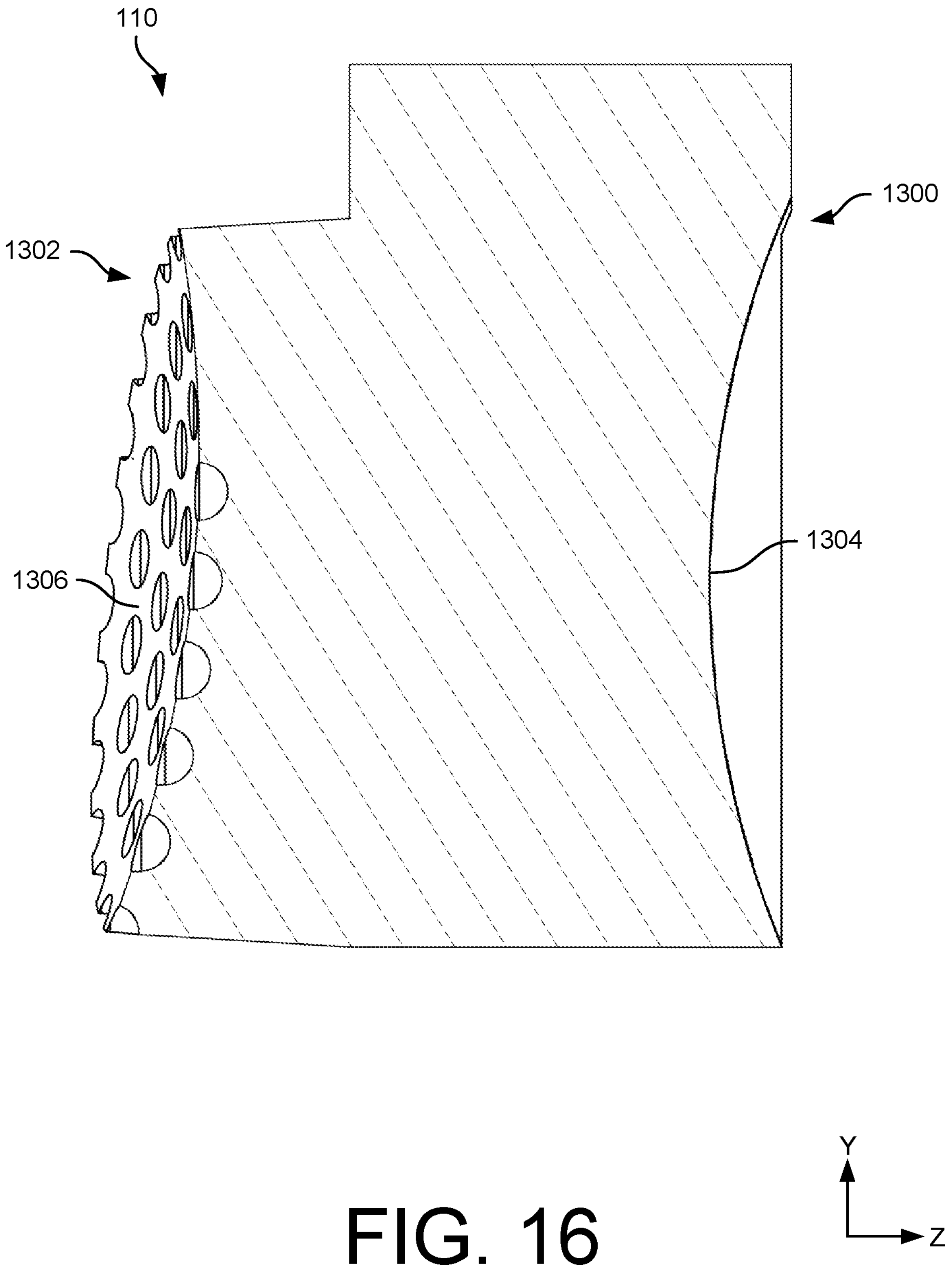
FIG. 16 illustrates a cross-sectional view of the light pipe of FIGS. 13A and 13B, taken along line B-B of FIG. 14B, according to examples of the present disclosure.

FIG. 16 illustrates a cross-sectional view of the light pipe 110, taken along line B B of FIG. 14B, according to examples of the present disclosure. The first end 1300 of the light pipe 110, or the first surface 1304, is shown being concave. The concavity of the first end 1300 may permit at least a portion of the IR LED 904 to reside within the first end 1300 (e.g., within a cavity formed via the concaved nature of the first surface 1304). Additionally, the second end 1302 of the light pipe 110, or the second surface 1306, may be concave. The first end 1300 may correspond to an input facet of the light pipe 110, while the second end 1302 may correspond to an output facet of the light pipe 110. In some instances, the concaved shaped of the first end 1300 (or the first surface 1304) and the second end 1302 (or the second surface 1306) may diverge IR light rays emitted via the IR LED 904 to create a larger field of view.

Figure 17:
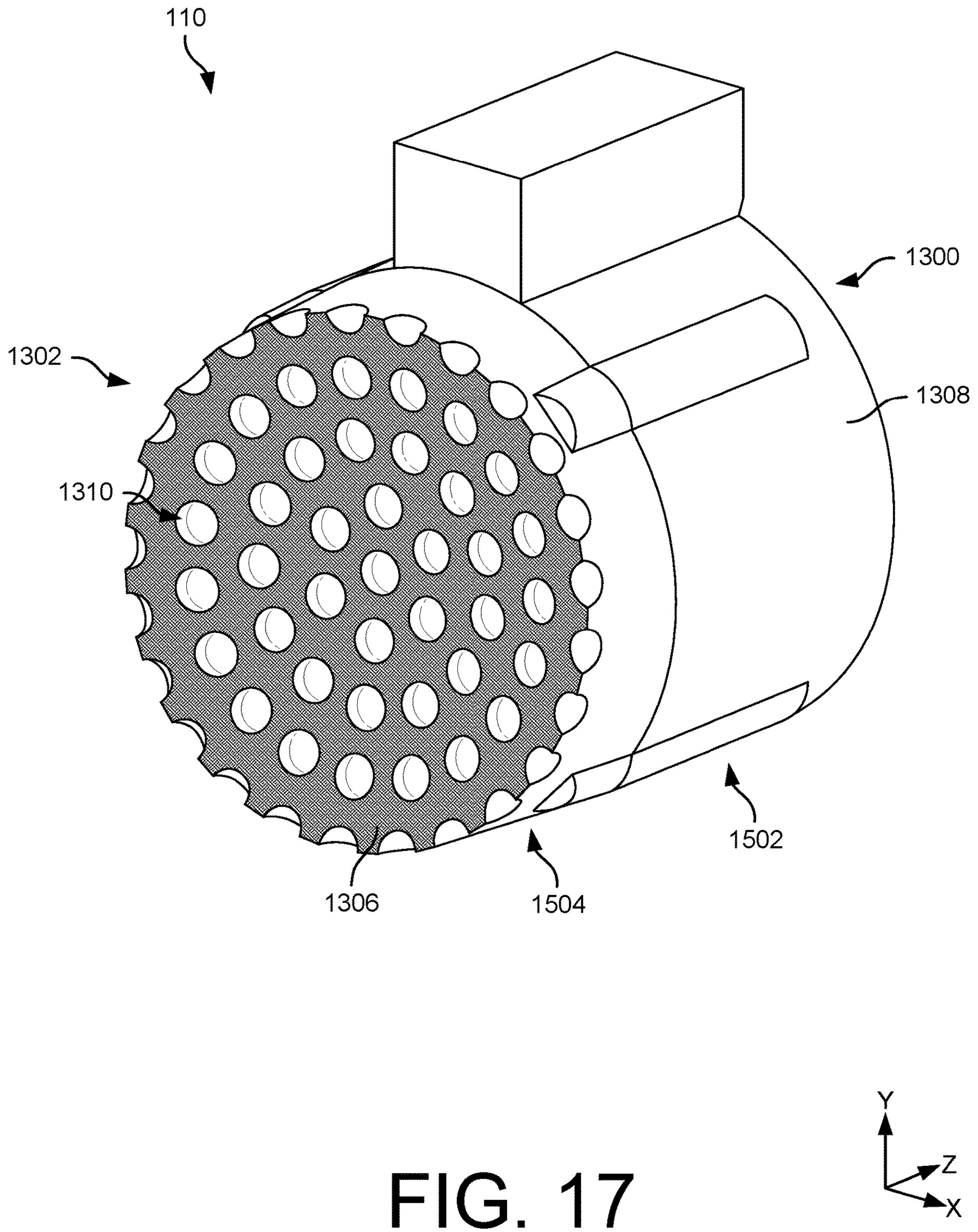
FIG. 17 illustrates a perspective view of the light pipe of FIGS. 13A and 13B, showing example surface finishes of the light pipe, according to examples of the present disclosure.

FIG. 17 illustrates a perspective view of the light pipe 110, showing different surface finishes of the light pipe 110, according to examples of the present disclosure.

In some instances, the light pipe 110 is manufactured from clear polycarbonate. In some instances, light pipe 110 may include different surface finishes. For example, the first surface 1304, the first portion 1502, and the second portion 1504, except for the second surface 1306, may include a first surface finish. In some instances, the first surface finish may be high-gloss. The high-gloss surface finish may assist in refracting light through the light pipe 110, from the first end 1300 to the second end 1302.

The second surface 1306 may include a second surface finish that is different than the first surface finish. The difference in surface finishes of the light pipe 110 are shown in FIG. 17 with the different texture of the second surface 1306. In some instances, the second surface 1306 has a VDI 21 surface finish that is more rough and/or textured as compared to the first surface finish. As shown in FIG. 17, and in some instances, the dimples 1310 may include the first surface finish. As such, in some instances, only the second surface 1306 at the second end 1302 (or the face thereof), may include the VDI 21 surface finish. In some instances, the VDI 21 surface finish may assist in light spreading and/or reducing hot spots. For example, by reducing hot spots of IR light emitted through the light pipe 110, hot spots may correspondingly be reduced on the IR sensor(s) or receiver(s) that receive the IR light. Although particular surface finishes are described, the light pipe 110 may include different surface finishes. For example, the second surface 1306 may include the VDI 21 surface finish.

Figure 18:
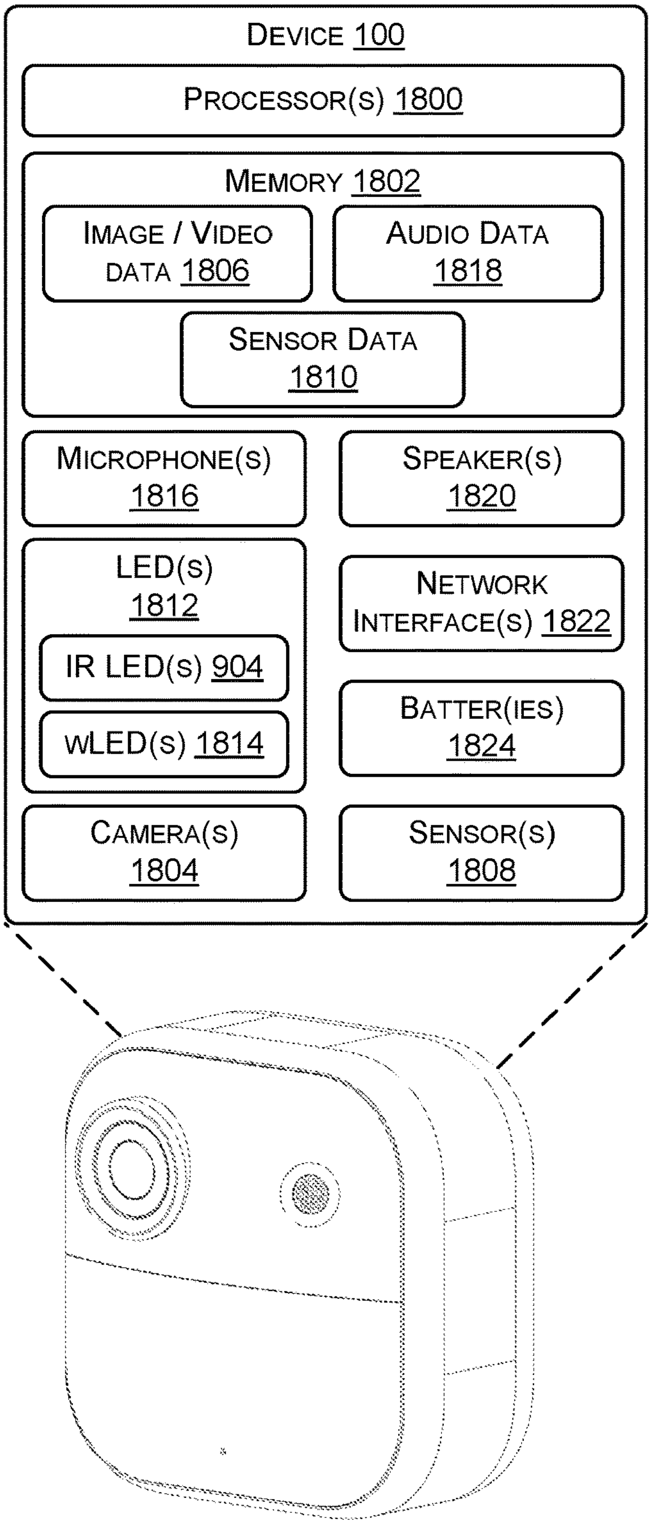
FIG. 18 illustrates select functional components of the device of FIG. 1, according to examples of the present disclosure.

FIG. 18 illustrates select components of the device 100, according to examples of the present disclosure. The device 100 is shown including processor(s) 1800 and memory 1802, where the processor(s) 1800 may perform various functions associated with controlling an operation of the device 100, and the memory 1802 may store instructions executable by the processor(s) 1800 to perform the operations described herein.

The device 100 includes camera(s) 1804 for capturing image/video data 1806 within an environment of the device 100. In some instances, the camera(s) 1804 may include red, green, blue, depth (RGBD) camera(s) and/or three-dimensional (3D) sensors. Additionally, the device 100 may include other sensor(s) 1808 (e.g., ambient light sensor) that generates sensor data 1810. The device 100 may also include the PIR sensor(s) that generates the sensor data 1810. In some instances, the PIR sensor(s) act as motion sensors for detecting movement within an environment of the device 100. In some instances, the PIR sensor(s) are used to detection motion within an environment of the device 100. However, in some instances, the camera(s) 1804, in addition to or alternative from the PIR sensor(s), may be used to detect motion. For example, computer vision techniques may be used to detect objects of interest. In some instances, the camera(s) 1804 may include a CMOS image sensor, and a digital processor that may perform embedded processing within the low-power CVM itself, such that the low-power CVM may output post-processed computer vision metadata to the processor(s) 1800. The metadata may include information such as the presence of a particular type of entity (e.g., person, animal, vehicle, parcel, etc.), a direction of movement of the entity, a distance of the entity from the device 100, etc. As a result of including the computer vision, the device 100 may leverage computer vision to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image.

The device 100 also includes LED(s) 1812, such as IR LEDs 904 and/or white LEDs (wLEDs), for illuminating and/or emitting light within the environment of the device 100. The LEDs may also output an indication of an operational status of the device 100 (e.g., the LED 1210). Any number of IR LEDs 904 and/or wLEDs 1814 may be included, and the IR LEDs 904 and the wLEDs 1814 may be arranged about various sides of the device 100 (e.g., front, sides, etc.). It also to be understood that the device 100 includes an IR receiver configured to receive the IR light emitted by the IR LEDs 904. In some instances, in response to detecting motion, the processor(s) 1800 that causes the camera(s) 1804 to capture the image/video data 1806. The IR LEDs 904 may be used to detect motion in low-light conditions.

The device 100 includes the microphone(s) 1816 that generate audio data 1818. Speaker(s) 1820 may output sound in a direction away from the device 100. The sound output by the speaker(s) 1820 may include the audio data 1818, which may be received from one or more communicatively coupled device, or other audio (e.g., siren, alarm, etc.).

Network interface(s) 1822 permit the device 100 to communicate over one or more networks. Example network interface(s) 1822 include, without limitation, Wi-Fi, Bluetooth, ZigBee, Bluetooth Low Energy (BLE), LTE, and so forth. The network interface(s) 1822 permit communication with remote device(s), such as mobile devices (e.g., phone), systems (e.g., cloud), and so forth. The network(s) may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

In some instances, inbound data from may be routed through the network interface(s) 1822 before being directed to the processor(s) 1800, and outbound data from the processor(s) 1800 may be routed through the network interface(s) 1822. The network interface(s) 1822 may therefore receive inputs, such as data, from the processor(s) 1800, the camera(s) 1804, the IR sensor(s), and so forth. For example, the network interface(s) 1822 may be configured to transmit data to and/or receive data from one or more network devices. The network interface(s) 1822 may act as a conduit for data communicated between various components and the processor(s) 1800.

Batter(ies) 1824 may power the components of the device 100. Any number of batter(ies) 1824 may be included, and the batter(ies) 1824 may be rechargeable/replaceable. Additionally, the device 100 may be powered using a source of external AC (alternating-current) power, such as mains power. When the batter(ies) 1824 are depleted, the batter(ies) 1824 may be recharged by connecting a power source to the batter(ies) 3000 (e.g., using a USB connector).

Although certain components of the device 100 are illustrated, it is to be understood that the device 100 may include additional or alternative components. For example, the device 100 may include other input/output devices (e.g., display screen), heat dissipating elements, computing components (e.g., PCBs), antennas, ports (e.g., USB), and so forth).

As used herein, a processor, such as the processor(s) 1800 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 1802 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A device, comprising:
a camera;
a housing;
a cover coupled to the housing, the cover including:
  a first channel, and
  a second channel;
a printed circuit board (PCB), the PCB including:
  a lighting element configured to emit first light out the first channel, and
  an infrared (IR) lighting element configured to emit second light out the second channel; and
  a light pipe at least partially disposed within the second channel, the light pipe including:
    a first end having a first surface oriented towards the IR lighting element, the first surface being concave and including a first surface finish, and
    a second end having a second surface, the second surface being concave and having a second surface finish that is different than the first surface finish,
    one or more dimples formed within the second surface, and
a gasket disposed at least partially around the light pipe and at least partially around the IR lighting element.

2. The device of claim 1, wherein:
the light pipe further includes:
  a first portion extending from the first end,
  a second portion extending from the second end, and
  the first portion extends a first lengthwise extent of the light pipe;

the second portion extends a second lengthwise extent of the light pipe, the second lengthwise extent being less than the first lengthwise extent; and the second portion tapers inwardly such that a cross-sectional area of the second portion proximate the first portion is greater than a cross-sectional area of the second portion proximate the second end.

3. The device of claim 1, wherein:

the device comprises a passive infrared sensor;

the first surface finish is a high-gloss surface finish; and the second surface has a roughness average (Ra) value of between 0.9 micrometers and 1.4 micrometers.

4. An electronic device, comprising:

a camera;

a printed circuit board (PCB);

a light source coupled to the PCB; and a light pipe, the light pipe including:

a first end oriented to receive light from the light source, and a second end opposite the first end, the second end having one or more dimples, wherein a first cross-sectional area of the light pipe proximate the first end is greater than a second cross-sectional area of the light pipe proximate the second end; and a gasket disposed at least partially around the light pipe and at least partially around the light source.

5. The electronic device of claim 4, wherein:

the first end includes a first surface having a first surface finish; and the second end includes a second surface having a second surface finish, the second surface finish being different than the first surface finish.

6. The electronic device of claim 5, wherein a roughness average (Ra) value of the first surface is greater than the Ra value of the second surface.

7. The electronic device of claim 4, wherein:

a surface of one of the one or more dimples has a high polish surface finish;

a surface of a portion of the second end that does not include a dimple has a matte surface finish.

8. The electronic device of claim 4, wherein:

a surface of one of the one or more dimples has a first roughness average value; and a surface of a portion of the second end that does not include a dimple has a second roughness average value that is greater than the first roughness average value.

9. The electronic device of claim 4, wherein a surface of one of the one or more dimples is smoother than a surface of a portion of the second end that does not include a dimple.

10. The electronic device of claim 4, wherein:

a surface of one of the one or more dimples has a first surface finish; and a surface of a portion of the second end has a second surface finish that is different than the first surface finish.

11. The electronic device of claim 10, wherein the second surface finish has a roughness average (Ra) value of between 0.9 micrometers and 1.4 micrometers.

12. The electronic device of claim 10, wherein the second surface finish has a roughness average (Ra) value of around 1.12 micrometers.

13. The electronic device of claim 10, wherein the electronic device comprises a passive infrared sensor.

14. The electronic device of claim 4, wherein the light source is an infrared (IR) lighting element.

15. The electronic device of claim 4, further comprising a cover including a channel, and wherein at least a portion of the light pipe is disposed within the channel.

16. The electronic device of claim 4, wherein the second end is concave.

17. The electronic device of claim 16, wherein the first end is concave.

18. The electronic device of claim 4, wherein:

the light pipe includes a first portion extending from the first end a first lengthwise extent of the light pipe and a second portion extending from the second end a second lengthwise extent of the light pipe, the second lengthwise extent being less than the first lengthwise extent;

the second portion tapers inwardly such that a cross-sectional area of the second portion proximate the first portion is greater than a cross-sectional area of the second portion proximate the second end; and the first portion does not taper such that a cross-sectional area of the first portion proximate the second portion is approximately the same as a cross-sectional area of the first portion proximate the first end.

19. The electronic device of claim 4, wherein at least one of the one or more dimples has a shape corresponding to a portion of a sphere.

20. A device, comprising:

a camera;

a lighting element; and a light pipe including:

a first end having a first surface oriented towards the lighting element, the first surface being concave, a second end having a second surface oriented away from the lighting element, the second surface being concave, a first portion extending from the first end a first lengthwise extent of the light pipe, and a second portion extending from the second end a second lengthwise extent of the light pipe, the second lengthwise extent being less than the first lengthwise extent;

wherein the second portion tapers inwardly such that a cross-sectional area of the second portion proximate the first portion is greater than a cross-sectional area of the second portion proximate the second end.

21. The device of claim 20, wherein:

at least part of the first portion includes a first surface finish; and at least part of the second portion includes a second surface finish that is different than the first surface finish.

22. The device of claim 21, wherein:

the first surface finish is high-gloss; and the second surface finish has a roughness average (Ra) value of between 0.9 micrometers and 1.4 micrometers.

23. The device of claim 20, wherein the light pipe further includes a plurality of dimples formed at least one of on or within the second surface.

24. The device of claim 20, further comprising a cover including a channel, wherein:

at least a portion of the light pipe is disposed within the channel; and the light pipe includes one or more ribs that engage with the channel.

* * * * *